(12) United States Patent
Strand et al.

(10) Patent No.: US 11,415,955 B2
(45) Date of Patent: Aug. 16, 2022

(54) VENDOR AGNOSTIC SHAREABLE DEVICE INTEGRATION AND META DATA TAGGING

(71) Applicant: Johnson Controls Technology Company, Auburn Hills, MI (US)

(72) Inventors: Lisa E. Strand, Wauwatosa, WI (US); Vivek V. Gupta, Shorewood, WI (US); Benjamin D. Sanfelippo, Glendale, WI (US); Mark T. Fischbach, New Berlin, WI (US); Adam Scott, Grafton, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 101 days.

(21) Appl. No.: 16/804,999

(22) Filed: Feb. 28, 2020

(65) Prior Publication Data
US 2021/0271220 A1 Sep. 2, 2021

(51) Int. Cl.
*G05B 19/042* (2006.01)

(52) U.S. Cl.
CPC ............ *G05B 19/0426* (2013.01); *G05B 2219/25011* (2013.01); *G05B 2219/2614* (2013.01)

(58) Field of Classification Search
CPC ........ G05B 19/0426; G05B 2219/2614; G05B 2219/25011
See application file for complete search history.

(56) References Cited

U.S. PATENT DOCUMENTS

| | | | |
|---|---|---|---|
| 2009/0228812 A1* | 9/2009 | Keenan, Jr | H04N 1/00976 715/762 |
| 2017/0212487 A1* | 7/2017 | Gupta | F24F 11/62 |
| 2017/0357607 A1 | 12/2017 | Cayemberg et al. | |
| 2018/0119972 A1* | 5/2018 | Trikha | F24F 11/62 |
| 2019/0108013 A1 | 4/2019 | Duraisingh et al. | |

OTHER PUBLICATIONS

U.S. Appl. No. 16/775,032, filed Jan. 28, 2020, Park et al.

* cited by examiner

*Primary Examiner* — Mohammad Ali
*Assistant Examiner* — Sheela Rao
(74) *Attorney, Agent, or Firm* — Foley & Lardner LLP

(57) ABSTRACT

A system for updating a device in a building management system (BMS). The system includes a third-party device and a device manager of a control network. The device manager updates the third-party device and includes a processing circuit that determines that the third-party device has been discovered on the control network. The processing circuit further populates a template with a set of received data from the third-party device and maps the third-party device with control network based on the populated template of received data. The processing circuit further configures the third-party device to operate in the control network, wherein configuring the third-party device comprises transforming a data exchange format of the third-party device.

21 Claims, 21 Drawing Sheets

Device
Device Name: My Rooftop
Vendor: Vendor Name
Model: RTU 2000
Profile: Default Auto Generated
⎫
⎬ — 902
⎭

Profile Strategy
Currently using the Default automatically generated profile for this device.
Choose a new profile strategy for this device.

[Use Default] — 904    [Modify] — 906    [Choose]    [Import]

| Point | Point | Writeable — 908 | On Homepage — 910 | Use Ids — 912 | Alarms — 914 |
|---|---|---|---|---|---|
| AV1 | AV1 | ☑ | ☑ | ▼ | ☑ |
| AV2 | AV2 | ☑ | ☑ | ▼ | ☑ |
| BV1 | BV1 | ☑ | ☑ | ▼ | ☑ |
| BV2 | BV2 | ☑ | ☑ | ▼ | ☑ |
| MV1 | MV1 | ☑ | ☑ | ▼ | ☑ |
| MV2 | | | | ▼ | ☑ |

[Save]

VENDOR AGNOSTIC SHAREABLE DEVICE INTEGRATION AND META DATA TAGGING

BACKGROUND

The present disclosure relates generally to building management systems. The present disclosure relates more particularly to configuring third-party devices for operation in a control system.

A building management system (BMS) is, in general, a system of devices configured to control, monitor, and manage equipment in or around a building or building area. A BMS can include a heating, ventilation, or air conditioning (HVAC) system, a security system, a lighting system, a fire alerting system, another system that is capable of managing building functions or devices, or any combination thereof. BMS devices may be installed in any environment (e.g., an indoor area or an outdoor area) and the environment may include any number of buildings, spaces, zones, rooms, or areas. A BMS may include VERASYS® building controllers or other devices sold by Johnson Controls, Inc., as well as building devices and components from other sources.

SUMMARY

One implementation of the present disclosure is a system for updating a device in a building management system (BMS). The system includes a third-party device and a device manager of a control network. The device manager updates the third-party device and includes a processing circuit that determines that the third-party device has been discovered on the control network. The processing circuit further populates a template with a set of received data from the third-party device and maps the third-party device with control network based on the populated template of received data. The processing circuit further configures the third-party device to operate in the control network, wherein configuring the third-party device comprises transforming a data exchange format of the third-party device.

In some embodiments, a user device includes a user interface connected to the control network. In some embodiments, the processing circuit generates a profile of the third-party device and displays the profile of the third-party device to the user interface, wherein the profile comprises the received data.

In some embodiments, the processing circuit generates a default template of the third-party device, wherein the default template includes vendor information or model information or firmware information.

In some embodiments, the control system network, the third-party device, the device manager, and the user device operate over a building operation controls network (BACnet) protocol, which may be BACnet/IP, BACnet/Ethernet, or BACnet/MSTP.

In some embodiments, configuring the third-party device further includes determining that the third-party device has not previously been connected to the control network and generating a new device profile for the third-party device based on the received data.

In some embodiments, configuring the third-party device further includes determining that the third-party device has previously been connected to the control network and providing a previous device profile based on the received data, wherein the received data comprises vendor information of the third-party device or model information of the third-party device or firmware information of the third-party device.

In some embodiments, the control network operates under a first network protocol and the third-party device operates under a second network protocol. In some embodiments, configuring the third-party device further includes converting the third-party device to operate from the second network protocol to the first network protocol.

Another implementation of the present disclosure is a method for updating a device in a building management system (BMS). The method includes determining that a third-party device has been discovered on a control network, the control network comprising a device manager and a user device. The method further includes populating a template with a set of received data from the third-party device. The method further includes mapping the third-party device with control network based on the populated template of received data. The method further includes configuring the third-party device to operate in the control network, wherein configuring the third-party device comprises transforming a data exchange format of the third-party device.

In some embodiments, the third-party device is connected to the control network via building automation controls network over industrial (BACnet/IP) protocol or building automation controls network over master slave token passing (BACnet/MSTP) protocol.

In some embodiments, the method further includes generating a profile of the third-party device and displaying the profile of the third-party device to a user interface, wherein the profile comprises the received data.

In some embodiments, the method further includes generating a default template of the third-party device, wherein the default template comprises vendor information or model information or firmware information.

In some embodiments, configuring the third-party device further includes determining that the third-party device has not previously been connected to the control network and generating a new device profile for the third-party device based on the received data.

In some embodiments, configuring the third-party device further includes determining that the third-party device has previously been connected to the control network and providing a previous device profile based on the received data, wherein the received data comprises vendor information of the third-party device or model information of the third-party device or firmware information of the third-party device.

In some embodiments, the control network operates under a first network protocol and third-party device operates under a second network protocol. In some embodiments, configuring the third-party device such that the third-party device further includes converting the third-party device to operate from the second network protocol to the first network protocol.

Another implementation of the present disclosure is a controller for updating a device in a building management system (BMS). The controller includes a processing circuit. The processing circuit determines that a third-party device has been discovered on a control network and populates a template with a set of received data from the third-party device. The processing circuit maps the third-party device with control network based on the populated template of received data. The processing circuit determines that the third-party device has previously been connected to the control network. The processing circuit provides a previous device profile based on the received data, wherein the received data comprises vendor information model information or firmware information of the third party device. The processing circuit configures the third-party device to operate in the control network, wherein configuring the third-party device comprises transforming a data exchange format of the third-party device.

In some embodiments, a user device includes a user interface connected to the control network. In some embodiments, the processing circuit generates a profile of the third-party device and displays the profile of the third-party device to the user interface, wherein the profile comprises the received data.

In some embodiments, the processing circuit generates a default template of the third-party device, wherein the default template includes vendor information, model information or firmware information.

In some embodiments, the control system network, the third-party device, the device manager, and the user device operate over a building operation controls network (BACnet) protocol, which may be BACnet/IP, BACnet/Ethernet, or BACnet/MSTP.

In some embodiments, configuring the third-party device further includes determining that the third-party device has not previously been connected to the control network and generating a new device profile for the third-party device based on the received data.

In some embodiments, configuring the third-party device further includes determining that the third-party device has previously been connected to the control network and providing a previous device profile based on the received data, wherein the received data comprises vendor information of the third-party device or model information of the third-party device or firmware information of the third-party device.

In some embodiments, the control network operates under a first network protocol and the third-party device operates under a second network protocol. In some embodiments, configuring the third-party device further includes converting the third-party device to operate from the second network protocol to the first network protocol.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIGS. 7-10 are various interfaces for displaying information related to configuring third-party devices for a control system which may be used in the system of FIG. 5, according to some embodiments.

DETAILED DESCRIPTION

Overview

Figure 1:
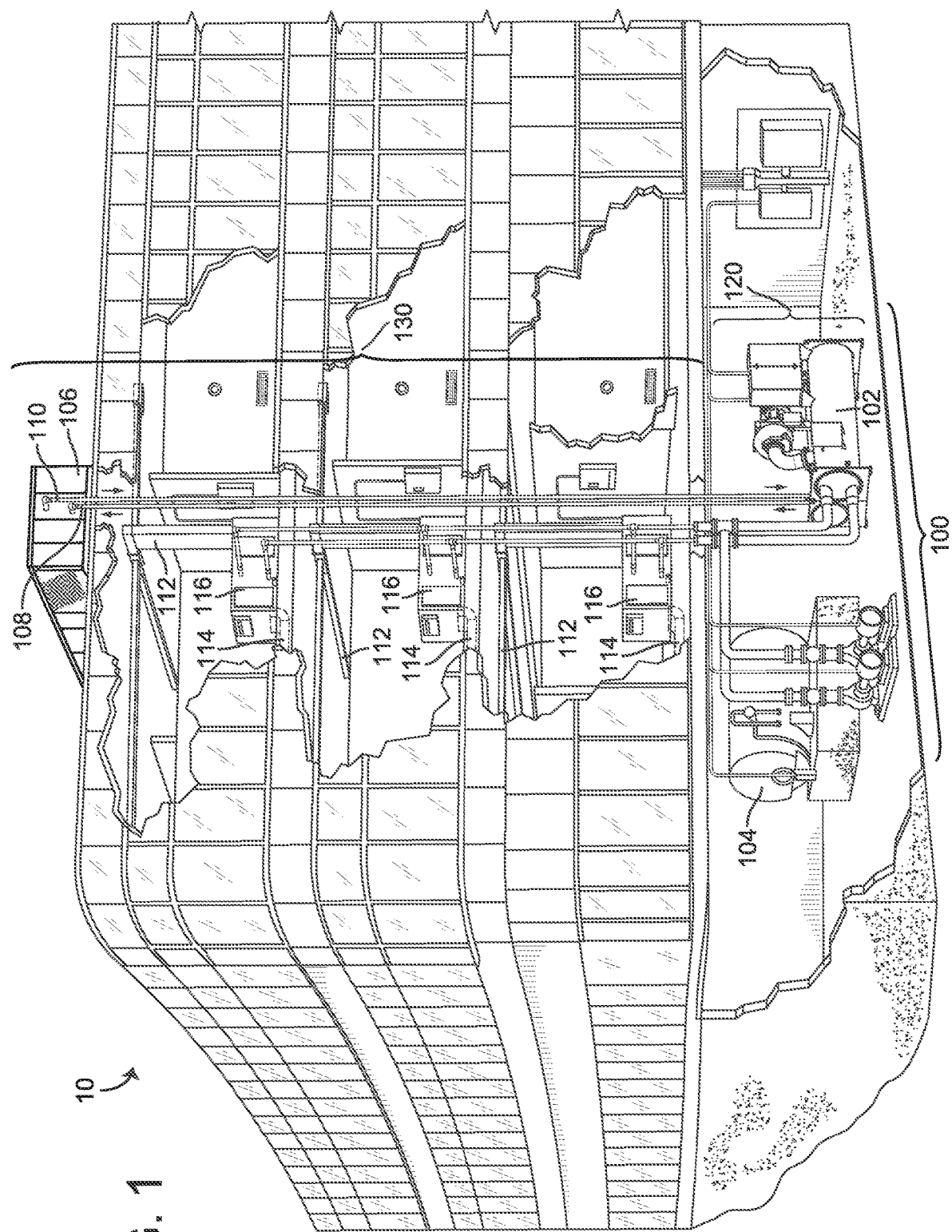
FIG. 1 is drawing of a building equipped with a heating, ventilating, and air conditioning (HVAC) system, according to some embodiments.

Referring generally to the FIGURES, a building management system (BMS) with automatic equipment discovery and equipment model distribution is shown, according to some embodiments. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

In brief overview, the BMS described herein provides a system architecture that facilitates automatic equipment discovery and equipment model distribution. Equipment discovery can occur on multiple levels of the BMS across multiple different communications busses (e.g., a system bus, zone buses, a sensor/actuator bus, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, the BMS can begin interacting with the new device (e.g., sending control signals, using data from the device) without user interaction.

Some devices in the BMS present themselves to the network using equipment models. An equipment model defines equipment object attributes, view definitions, schedules, trends, and the associated BACnet value objects (e.g., analog value, binary value, multistate value, etc.) that are used for integration with other systems. Some devices in the BMS store their own equipment models. Other devices in the BMS have equipment models stored externally (e.g., within other devices). For example, a zone coordinator can store the equipment model for a bypass damper. In some embodiments, the zone coordinator automatically creates the equipment model for the bypass damper and/or other devices on the zone bus. Other zone coordinators can also create equipment models for devices connected to their zone busses. The equipment model for a device can be created automatically based on the types of data points exposed by the device on the zone bus, device type, and/or other device attributes.

Referring generally to the FIGURES, systems and methods for configuring $3^{rd}$ party building automation controls network (BACnet) devices are shown, according to exemplary embodiments. Configuring $3^{rd}$ party BACnet devices may enable those devices to participate in features of a pre-established building control system (e.g., VERASYS®) that would otherwise require the device to be designed and implemented with additional features (e.g., smart equipment, etc.).

In some embodiments, the systems and methods described herein include discovering and automatically implementing default configuration of BACnet devices that do not support smart equipment components (e.g., $3^{rd}$ party devices, etc.). In some embodiments, this includes discovering the BACnet properties (e.g., points, etc.) exposed by the $3^{rd}$ party device and creating an equipment template containing references to the BACnet data with default parameters for various fields (e.g., min/max values, point writability, point name, etc.). This may further include creating an equipment view definition (e.g., profile, etc.) to organize the points for a user interface.

In some embodiments, the systems and methods described herein include creating a configuration to adapt the BACnet data to a different metadata format (e.g., smart equipment for VERASYS®, etc.). A collection of configuration parameters may form a "profile" of a device. This process may begin by having the user select a device to use as a base device to provide all of the references (e.g., data objects, data, etc.) to the BACnet points. For example, the device profile may include: point name, point intended usage (e.g., setpoint, outdoor air temperature, etc.), alarm configuration of the point, trend configuration of the point, view information (e.g., how the point with appear on a user interface, etc.).

In some embodiments, the systems and methods described herein include associating a configuration with a device (e.g., a $3^{rd}$ party device). This may include a smart building hub (SBH) (e.g., supervisory controller, device manager, etc.) recognizing equipment that is not operable under its present configuration in the system of which the SBH operates in. For this equipment (e.g., devices), the user is given the option to associate a profile with the device. When the user selects a profile for a device, the SBH may use a particular configuration for the chosen device. From then on, that device may appear to be using the format that the SBH understands. In some embodiments, a given profile can be applied to multiple devices. This could possibly be done automatically by associating during discovery based on information the device provides (e.g., model information, vendor information, etc.).

In some embodiments, the systems and methods described herein include packaging a configuration for distribution and sharing the package across sites (e.g., different buildings, different regions, etc.). In some embodiments, this includes sharing across multiple SBH devices. Profiles may be given a globally unique ID and may be a collection of data exchange formatting files (e.g., JSON files, etc.) describing the configuration aspects. In some embodiments, the profiles can be bundled and imported or exported between different SBH's to share device configuration profiles. This may be done such that once a particular piece of equipment has a profile created for it, it can be reused among different users in the control system (e.g., different VERASYS® users, etc.).

Advantageously, the systems and methods described herein enables the use of BMS features for $3^{rd}$ party devices, such as sending point data to cloud services, point scheduling, and/or point interlocking with equipment that does not support the pre-established BMS architecture. This may enable the use of a SBH with $3^{rd}$ party devices that are not created for the control system established (e.g., Johnson Controls smart equipment for VERASYS®, etc.), but do follow the BACnet standard for exposing their points (e.g., properties). This may include generically enabling one or more smart features of the SBH with the $3^{rd}$ party devices and improve profile sharing, wherein the profiles are generated by a technician at one site and importing (e.g., reusing) the sample profile at another site without implementing the configuration process again.

Building Management System

Referring now to FIG. 1, an exemplary building and HVAC system in which the systems and methods of the present invention can be implemented are shown, according to an exemplary embodiment. In FIG. 1, a perspective view of a building 10 is shown. Building 10 is served by a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Figure 2:
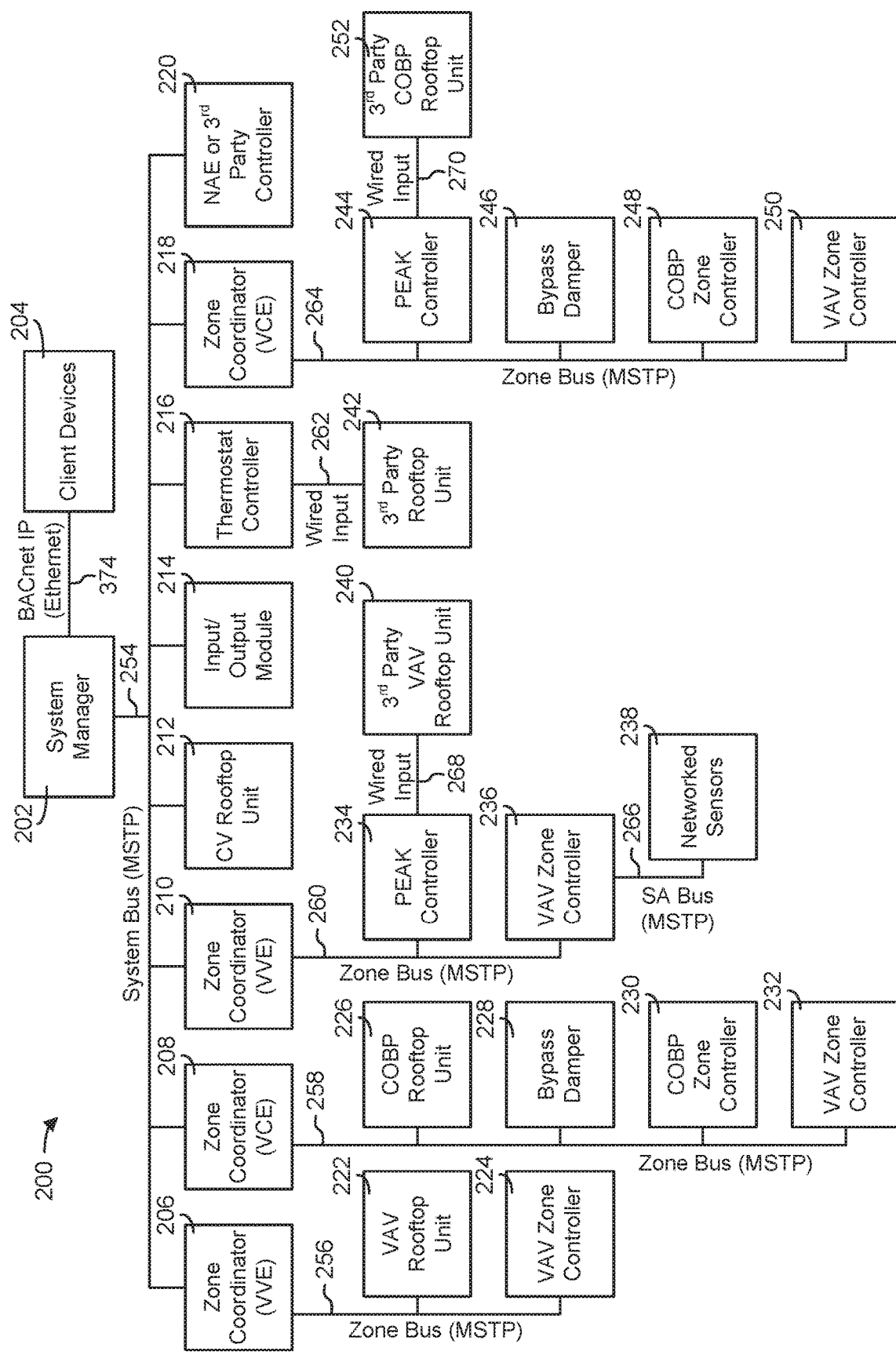
FIG. 2 is a block diagram of a building management system (BMS) which can be used to monitor and control the building and HVAC system of FIG. 1, according to some embodiments.

Referring now to FIG. 2, a block diagram of a building management system (BMS) 200 is shown, according to an exemplary embodiment. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof. BMS 200 can be used to monitor and control the devices of HVAC system 100 and/or airside system 200 (e.g., HVAC equipment) as well as other types of BMS devices (e.g., lighting equipment, security equipment, etc.).

In brief overview, BMS 200 provides a system architecture that facilitates automatic equipment discovery and equipment model distribution. Equipment discovery can occur on multiple levels of BMS 200 across multiple different communications busses (e.g., a system bus 254, zone buses 256-260 and 264, sensor/actuator bus 266, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 200 can begin interacting with the new device (e.g., sending control signals, using data from the device) without user interaction.

Some devices in BMS 200 present themselves to the network using equipment models. An equipment model defines equipment object attributes, view definitions, schedules, trends, and the associated BACnet value objects (e.g., analog value, binary value, multistate value, etc.) that are used for integration with other systems. An equipment model for a device can include a collection of point objects that provide information about the device (e.g., device name, network address, model number, device type, etc.) and store present values of variables or parameters used by the device. For example, the equipment model can include point objects (e.g., standard BACnet point objects) that store the values of input variables accepted by the device (e.g., setpoint, control parameters, etc.), output variables provided by the device (e.g., temperature measurement, feedback signal, etc.), configuration parameters used by the device (e.g., operating mode, actuator stroke length, damper position, tuning parameters, etc.). The point objects in the equipment model can be mapped to variables or parameters stored within the device to expose those variables or parameters to external systems or devices.

Some devices in BMS 200 store their own equipment models. Other devices in BMS 200 have equipment models stored externally (e.g., within other devices). For example, a zone coordinator 208 can store the equipment model for a bypass damper 228. In some embodiments, zone coordinator 208 automatically creates the equipment model for bypass damper 228 or other devices on zone bus 258. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 2, BMS 200 is shown to include a system manager 202; several zone coordinators 206, 208, 210 and 218; and several zone controllers 224, 230, 232, 236, 248, and 250. System manager 202 can communicate with client devices 204 (e.g., user devices, desktop computers, laptop computers, mobile devices, etc.) via a data communications link 374 (e.g., BACnet IP, Ethernet, wired or wireless communications, etc.). System manager 202 can provide a user interface to client devices 204 via data communications link 374. The user interface may allow users to monitor and/or control BMS 200 via client devices 204.

In some embodiments, system manager 202 is connected with zone coordinators 206-210 and 218 via a system bus 254. System bus 254 can include any of a variety of communications hardware (e.g., wire, optical fiber, terminals, etc.) configured to facilitate communications between system manager and other devices connected to system bus 254. Throughout this disclosure, the devices connected to system bus 254 are referred to as system bus devices. System manager 202 can be configured to communicate with zone coordinators 206-210 and 218 via system bus 254 using a master-slave token passing (MSTP) protocol or any other communications protocol. System bus 254 can also connect system manager 202 with other devices such as a constant volume (CV) rooftop unit (RTU) 212, an input/output module (TOM) 214, a thermostat controller 216 (e.g., a TEC2000 series thermostat controller), and a network automation engine (NAE) or third-party controller 220. RTU 212 can be configured to communicate directly with system manager 202 and can be connected directly to system bus 254. Other RTUs can communicate with system manager 202 via an intermediate device. For example, a wired input 262 can connect a third-party RTU 242 to thermostat controller 216, which connects to system bus 254.

System manager 202 can provide a user interface for any device containing an equipment model. Devices such as zone coordinators 206-210 and 218 and thermostat controller 216 can provide their equipment models to system manager 202 via system bus 254. In some embodiments, system manager 202 automatically creates equipment models for connected devices that do not contain an equipment model (e.g., IOM 214, third party controller 220, etc.). For example, system manager 202 can create an equipment model for any device that responds to a device tree request. The equipment models created by system manager 202 can be stored within system manager 202. System manager 202 can then provide a user interface for devices that do not contain their own equipment models using the equipment models created by system manager 202. In some embodiments, system manager 202 stores a view definition for each type of equipment connected via system bus 254 and uses the stored view definition to generate a user interface for the equipment.

Each zone coordinator 206-210 and 218 can be connected with one or more of zone controllers 224, 230-232, 236, and 248-250 via zone buses 256, 258, 260, and 264. Zone busses 256, 258, 260, and 264 can include any of a variety of communications hardware (e.g., wire, optical fiber, terminals, etc.) configured to facilitate communications between a zone coordinator and other devices connected to the corresponding zone bus. Throughout this disclosure, the devices connected to zone busses 256, 258, 260, and 264 are referred to as zone bus devices. Zone coordinators 206-210 and 218 can communicate with zone controllers 224, 230-232, 236, and 248-250 via zone busses 256-260 and 264 using a MSTP protocol or any other communications protocol. Zone busses 256-260 and 264 can also connect zone coordinators 206-210 and 218 with other types of devices such as variable air volume (VAV) RTUs 222 and 240, changeover bypass (COBP) RTUs 226 and 252, bypass dampers 228 and 246, and PEAK controllers 234 and 244.

Zone coordinators 206-210 and 218 can be configured to monitor and command various zoning systems. In some embodiments, each zone coordinator 206-210 and 218 monitors and commands a separate zoning system and is connected to the zoning system via a separate zone bus. For example, zone coordinator 206 can be connected to VAV RTU 222 and zone controller 224 via zone bus 256. Zone coordinator 208 can be connected to COBP RTU 226, bypass damper 228, COBP zone controller 230, and VAV zone controller 232 via zone bus 258. Zone coordinator 210 can be connected to PEAK controller 234 and VAV zone controller 236 via zone bus 260. Zone coordinator 218 can be connected to PEAK controller 244, bypass damper 246, COBP zone controller 248, and VAV zone controller 250 via zone bus 264.

A single model of zone coordinator 206-210 and 218 can be configured to handle multiple different types of zoning systems (e.g., a VAV zoning system, a COBP zoning system, etc.). Each zoning system can include a RTU, one or more zone controllers, and/or a bypass damper. For example, zone coordinators 206 and 210 are shown as VERASYS® VAV engines (VVEs) connected to VAV RTUs 222 and 240, respectively. Zone coordinator 206 is connected directly to VAV RTU 222 via zone bus 256, whereas zone coordinator 210 is connected to a third party VAV RTU 240 via a wired input 268 provided to PEAK controller 234. Zone coordinators 208 and 218 are shown as VERASYS® COBP engines (VCEs) connected to COBP RTUs 226 and 252, respectively. Zone coordinator 208 is connected directly to COBP RTU 226 via zone bus 258, whereas zone coordinator 218 is connected to a third-party COBP RTU 252 via a wired input 270 provided to PEAK controller 244.

Zone controllers 224, 230-232, 236, and 248-250 can communicate with individual BMS devices (e.g., sensors, actuators, etc.) via sensor/actuator (SA) busses. For example, VAV zone controller 236 is shown connected to networked sensors 238 via SA bus 266. Networked sensors 238 can include, for example, temperature sensors, humidity sensors, pressure sensors, lighting sensors, security sensors, or any other type of device configured to measure and/or provide an input to zone controller 236. Zone controller 236 can communicate with networked sensors 238 using a MSTP protocol or any other communications protocol. Although only one SA bus 266 is shown in FIG. 2, it should be understood that each zone controller 224, 230-232, 236, and 248-250 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 224, 230-232, 236, and 248-250 can be configured to monitor and control a different building zone. Zone controllers 224, 230-232, 236, and 248-250 can use the inputs and outputs provided via their SA busses to monitor and control various building zones. For example, zone controller 236 can use a temperature input received from networked sensors 238 via SA bus 266 (e.g., a measured temperature of a building zone) as feedback in a temperature control algorithm. Zone controllers 224, 230-232, 236, and 248-250 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Figure 3:
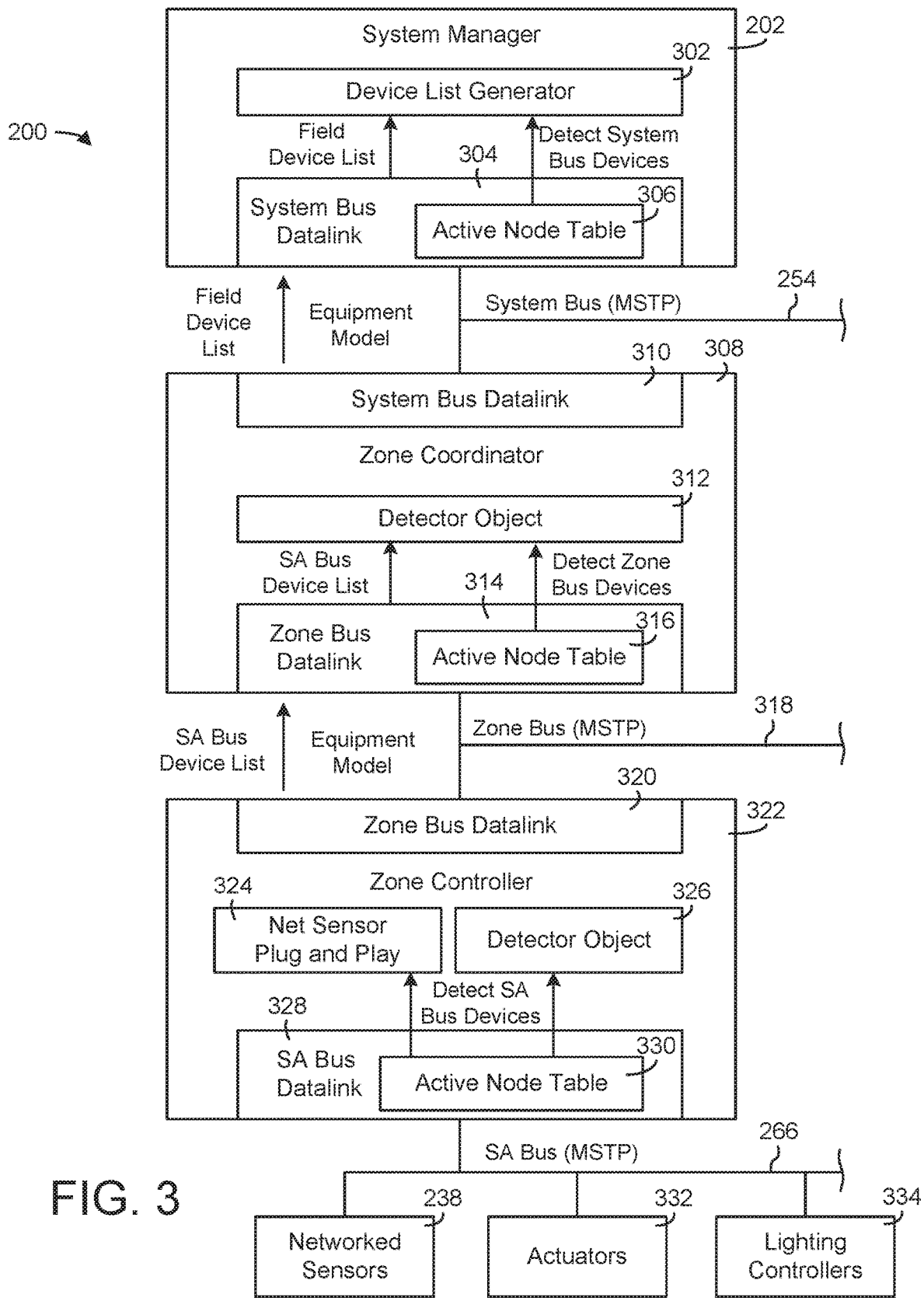
FIG. 3 is a block diagram illustrating a system manager, zone coordinator, and zone controller of the BMS of FIG. 2 in greater detail, according to some embodiments.

Referring now to FIG. 3, a block diagram illustrating a portion of BMS 200 in greater detail is shown, according to an exemplary embodiment. BMS 200 is shown to include system manager 202, a zone coordinator 308, and a zone controller 322. Zone coordinator 308 can be any of zone coordinators 206-210 or 218. Zone controller 322 can be any of zone controllers 224, 230, 232, 236, 248, or 250. Zone coordinator 308 can be connected with system manager via system bus 254. For example, system bus 254 is shown connecting a first system bus datalink 304 within system manager 202 with a second system bus datalink 310 within zone coordinator 308. Zone coordinator 308 can connect with zone controller 322 via a zone bus 318. For example, zone bus 318 is shown connecting a first zone bus datalink 314 within zone coordinator 308 with a second zone bus datalink 320 within zone controller 322. Zone bus 318 can be any of zone busses 256-260 or 264. Zone controller 322 is connected with networked sensors 238 and actuators 332 via a SA bus 266.

BMS 200 can automatically discover new equipment connected to any of system bus 254, zone bus 318, and SA bus 266. Advantageously, the equipment discovery can occur automatically (e.g., without user action) without requiring the equipment to be placed in discovery mode and without sending a discovery command to the equipment. In some embodiments, the automatic equipment discovery is based on active node tables for system bus 254, zone bus 318, and SA bus 266. Each active node table can provide status information for the devices communicating on a particular bus. For example, the active node table 306 for system bus 254 can indicate which MSTP devices are participating in the token ring used to exchange information via system bus 254. Active node table 306 can identify the devices communicating on system bus 254 by MAC address or other device identifier. Devices that do not participate in the token ring (e.g., MSTP slave devices) can be automatically discovered using a net sensor plug and play (described in greater detail below).

The active node table for each communications bus can be stored within one or more devices connected to the bus. For example, active node table 306 can be stored within system manager 202. In some embodiments, active node table 306 is part of a system bus datalink 304 (e.g., a MSTP datalink) used by system manager 202 to communicate via system bus 254. System manager 202 can subscribe to changes in value of active node table 306 and can receive a notification (e.g., from system bus datalink 304) when a change in active node table 306. In response to a notification that a change in active node table 306 has occurred, system manager 202 can read active node table 306 to detect and identify the devices connected to system bus 254.

In some embodiments, a device list generator 302 within system manager 202 generates a list of the devices connected to system bus 254 (i.e., a device list) based on active node table 306 and stores the device list within system manager 202. The device list generated by system manager 202 can include information about each device connected to system bus 254 (e.g., device type, device model, device ID, MAC address, device attributes, etc.). When a new device is detected on system bus 254, system manager 202 can automatically retrieve the equipment model from the device if the device stores its own equipment model. If the device does not store its own equipment model, system manager 202 can retrieve a list of point values provided by the device. System manager 202 can then use the equipment model and/or list of point values to present information about the connected system bus devices to a user.

The active node tables for each zone bus can be stored within the zone coordinator connected to the zone bus. For example, the active node table 316 for zone bus 318 can be stored within zone coordinator 308. In some embodiments, active node table 316 is part of a zone bus datalink 314 (e.g., a MSTP datalink) used by the zone coordinator 308 to communicate via zone bus 318. Zone coordinator 308 can subscribe to changes in value of active node table 316 and can receive a notification (e.g., from zone bus datalink 314) when a change in active node table 316 occurs. In response to a notification that a change to active node table 316 has occurred, zone coordinator 308 can read active node table 316 to identify the devices connected to zone bus 318.

In some embodiments, a detector object 312 of zone coordinator 308 generates a list of the devices communicating on zone bus 318 (i.e., a device list) based on active node table 316 and stores the device list within zone coordinator 308. Each zone coordinator in BMS 200 can generate a list of devices on the connected zone bus. The device list generated by each zone coordinator 308 can include information about each device connected to zone bus 318 (e.g., device type, device model, device ID, MAC address, device attributes, etc.). When a new device is detected on zone bus 318, the connected zone coordinator 308 can automatically retrieve the equipment model from the device if the device stores its own equipment model. If the device does not store its own equipment model, the connected zone coordinator 308 can retrieve a list of point values provided by the device.

Zone coordinator 308 can incorporate the new zone bus device into the zoning logic and can inform system manager 202 that a new zone bus device has been added. For example, zone coordinator 308 is shown providing a field device list to system manager 202. The field device list can include a list of devices connected to zone bus 318 and/or SA bus 266. System manager 202 can use the field device list and the list of system bus devices to generate a device tree including all of the devices in BMS 200. In some embodiments, zone coordinator 308 provides an equipment model for a connected zone bus device to system manager 202. System manager 202 can then use the equipment model and/or list of point values for the new zone bus device to present information about the new zone bus device to a user.

In some embodiments, the device list generated by each zone coordinator 308 indicates whether system manager 202 should communicate directly with the listed zone bus device (e.g., VAV RTU 222, VAV zone controller 224, etc.) or whether system manager 202 should communicate with the intermediate zone coordinator 308 on behalf of the zone bus device. In some embodiments, system manager 202 communicates directly with zone bus devices that provide their own equipment models, but communicates with the intermediate zone coordinator 308 for zone bus devices that do not provide their own equipment model. As discussed above, the equipment models for zone bus devices that do not provide their own equipment model can be generated by the connected zone coordinator 308 and stored within the zone coordinator 308. Accordingly, system manager 202 may communicate directly with the device that stores the equipment model for a connected zone bus device (i.e., the zone bus device itself or the connected zone coordinator 308).

The active node table 330 for SA bus 266 can be stored within zone controller 322. In some embodiments, active node table 330 is part of the SA bus datalink 328 (e.g., a MSTP datalink) used by zone controller 322 to communicate via SA bus 266. Zone controller 322 can subscribe to changes in value of the active node table 330 and can receive a notification (e.g., from SA bus datalink 328) when a change in active node table 330 occurs. In response to a notification that a change to active node table 330 has occurred, zone controller 322 can read active node table 330 to identify some or all of the devices connected to SA bus 266. In some embodiments, active node table 330 identifies only the SA bus devices participating in the token passing ring via SA bus 266 (e.g., MSTP master devices). Zone controller 322 can include an additional net sensor plug and play (NsPnP) 324 configured to detect SA bus devices that do not participate in the token passing ring (e.g., MSTP slave devices).

In some embodiments, NsPnP 324 is configured to actively search for devices connected to SA bus 266 (e.g., networked sensors 238, actuators 332, lighting controllers 334, etc.). For example, NsPnP 324 can send a "ping" to a preconfigured list of MSTP slave MAC addresses. For each SA bus device that is discovered (i.e. responds to the ping), NsPnP 324 can dynamically bring it online. NsPnP 324 can bring a device online by creating and storing an instance of a SA bus device object representing the discovered SA bus device. NsPnP 324 can automatically populate the SA bus device object with all child point objects needed to collect and store point data (e.g., sensor data) from the newly discovered SA bus device. In some embodiments, NsPnP 324 automatically maps the child point objects of the SA bus device object to attributes of the equipment model for zone controller 322. Accordingly, the data points provided by the SA bus devices can be exposed to zone coordinator 308 and other devices in BMS 200 as attributes of the equipment model for zone controller 322.

In some embodiments, a detector object 326 of zone controller 322 generates a list of the devices connected to SA bus 266 (i.e., a device list) based on active node table 330 and stores the device list within zone controller 322. NsPnP 324 can update the device list to include any SA bus devices discovered by NsPnP 324. The device list generated by zone controller 322 can include information about each device connected to SA bus 266 (e.g., device type, device model, device ID, MAC address, device attributes, etc.). When a new device is detected on SA bus 266, zone controller 322 can automatically retrieve the equipment model from the device if the device stores its own equipment model. If the device does not store its own equipment model, zone controller 322 can retrieve a list of point values provided by the device.

Zone controller 322 can incorporate the new SA bus device into the zone control logic and can inform zone coordinator 308 that a new SA bus device has been added. Zone coordinator 308 can then inform system manager 202 that a new SA bus device has been added. For example, zone controller 322 is shown providing a SA device list to zone coordinator 308. The SA device list can include a list of devices connected to SA bus 266. Zone coordinator 308 can use the SA device list and the detected zone bus devices to generate the field device list provided to system manager 202. In some embodiments, zone controller 322 provides an equipment model for a connected SA bus device to zone coordinator 308, which can be forwarded to system manager 202. System manager 202 can then use the equipment model and/or list of point values for the new SA bus device to present information about the new SA bus device to a user. In some embodiments, data points provided by the SA bus device are shown as attributes of the zone controller 322 to which the SA bus device is connected.

Additional features and advantages of BMS 200, system manager 202, zone coordinator 308, and zone controller 322 are described in detail in U.S. patent application Ser. No. 15/179,894 filed Jun. 10, 2016, the entire disclosure of which is incorporated by reference herein.

Device Integration System

Figure 4A:
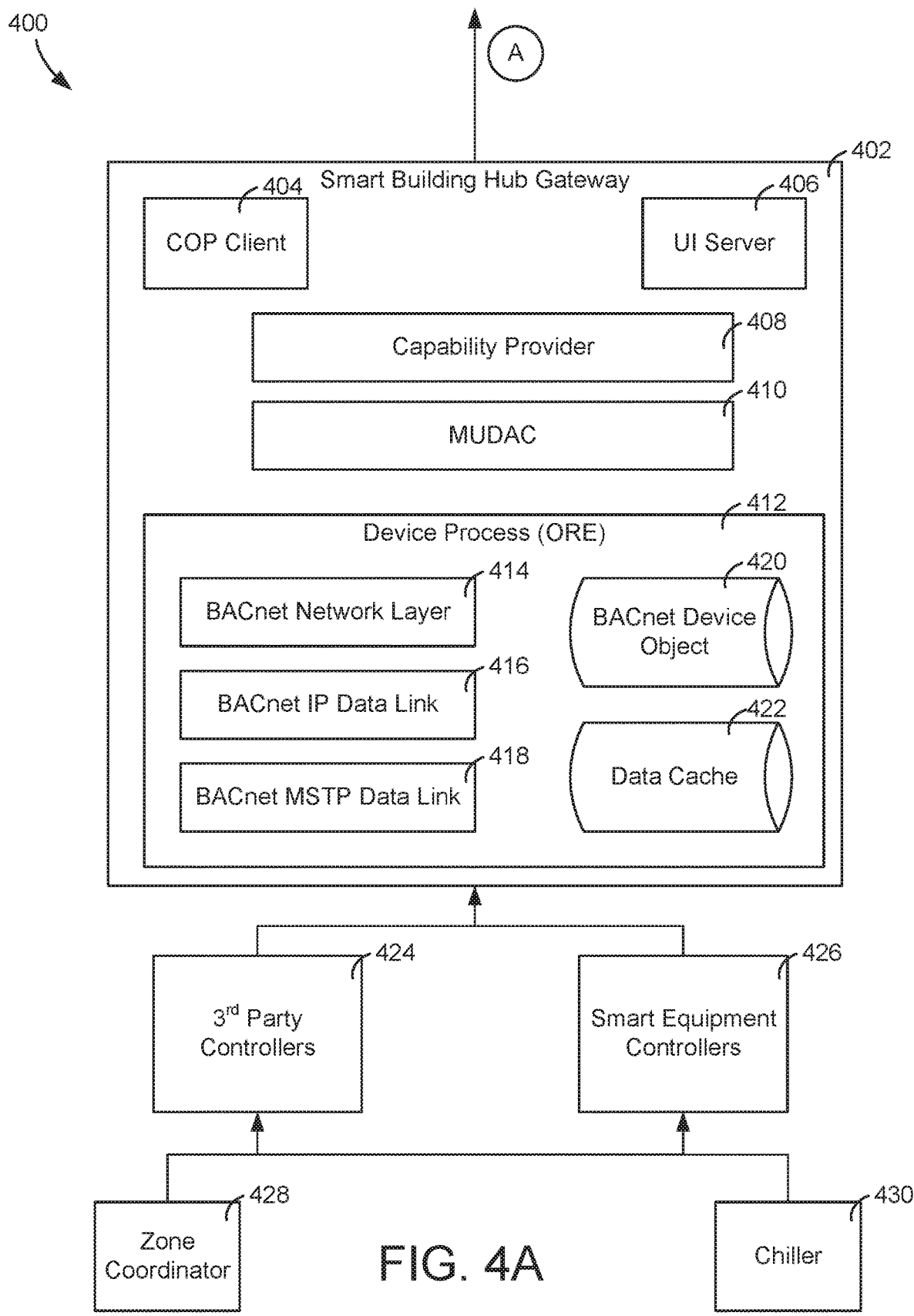
FIGS. 4A-B are block diagrams of a system for receiving information from various controllers and providing the information to a user interface via a cloud, which can be implemented in the HVAC system of FIG. 1, according to some embodiments.

Referring now to FIG. 4A, a system 400 for integrating a third- (e.g., $3^{rd}$) party controller is shown, according to an exemplary embodiment. FIG. 4 may be incorporated partially or entirely into system 200 and system 200 may incorporated partially or entirely into system 400. In some embodiments, FIG. 4 outlines a process for providing information from $3^{rd}$ party controllers to various user interfaces connected to a cloud. FIG. 4 is shown to include smart building hub gateway 402, $3^{rd}$ party controllers 424, smart equipment controllers 426, and chiller 430.

Smart building hub (SBH) gateway 402 may be a component of SBH described in greater detail below with reference to FIGS. 6A-B. SBH 602 may be configured to receive (e.g., collect) change of value (COV) data from various equipment controllers and transmit the values to one or more servers. SBH 602 may also be configured to provide a local user interface (UI) to one or more devices for monitoring, commissioning, and controlling system 400.

Zone coordinator 428 may be substantially similar or identical to various zone coordinators described with reference to system 200 (e.g., zone coordinator 206, etc.). Zone coordinator 428 may be configured to provide various properties (e.g., temperature, operational parameters, power consumption, etc.) relating to zone coordinator 428 to $3^{rd}$ party controllers 424 and/or smart equipment controllers 426. Chiller 430 may be a standard industrial chiller in a heating, ventilation, or air conditioning (HVAC) configured to provide various properties (e.g., temperature, operational parameters, power consumption, etc.) relating to chiller 430 to $3^{rd}$ party controllers 424 and/or smart equipment controllers 426. $3^{rd}$ party controllers 424 and smart equipment controllers 426 may be configured to receive properties from various devices (e.g., VAV controllers, bypass dampers, boilers, RTU's, etc.) within system 200 or any other system within building 10 and are not limited to zone coordinator 428 and chiller 430 (e.g., equipment devices) as shown in FIG. 4A. Various properties (e.g., data, data objects, points, data points, BACnet objects, BACnet points, etc.) that may be provided by equipment devices are described in greater detail below.

Figure 5:
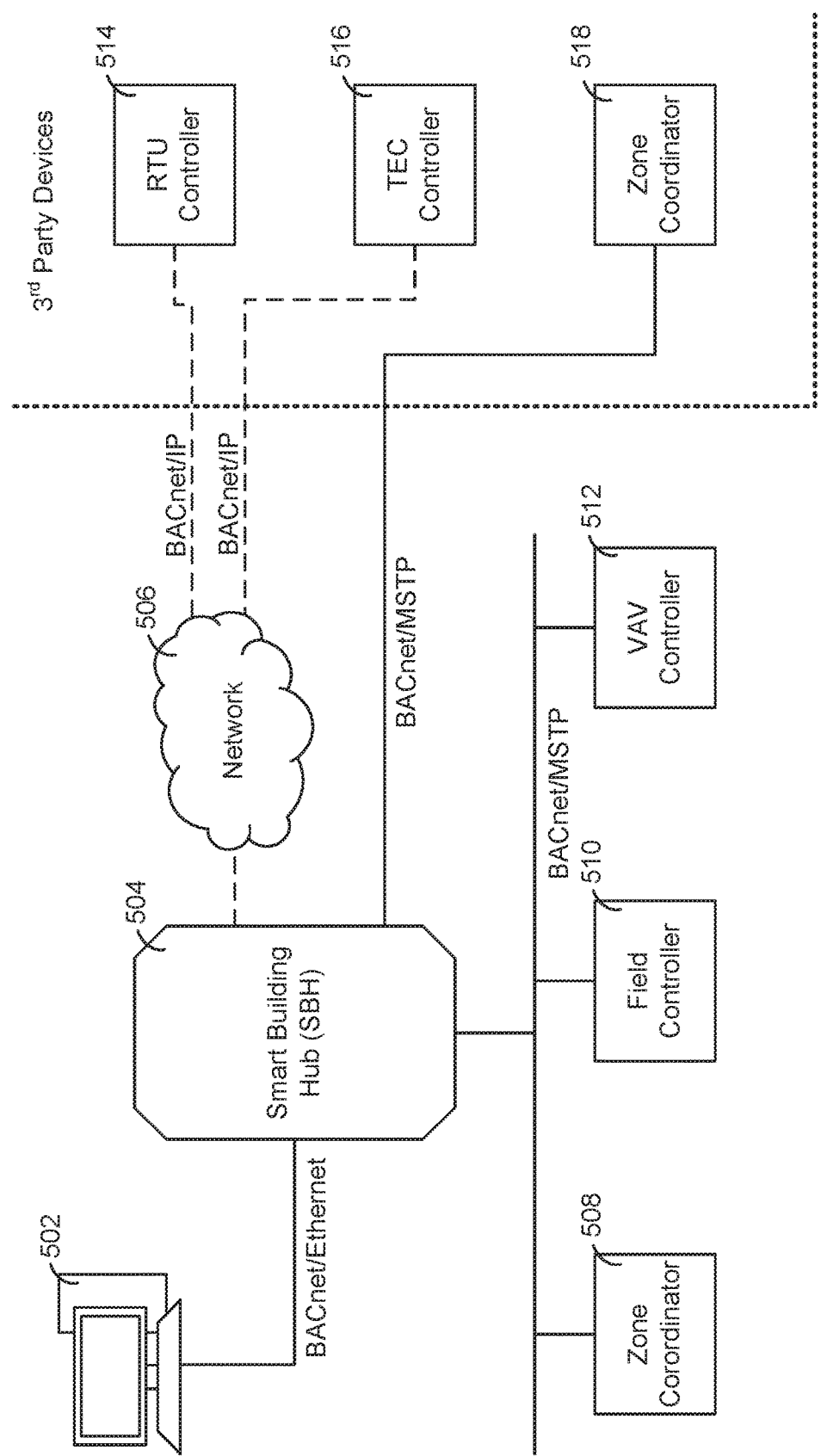
FIG. 5 is a block diagram for connecting a third-party device to a control system, which can be used in the system of FIG. 4, according to some embodiments.

$3^{rd}$ party controllers 424 may be various controllers (e.g., control devices, network engines, thermostats, etc.) that are not connected to the same system as smart equipment controllers 426. For example, smart equipment controllers 426 may be connected in a "smart network" (e.g., as shown in FIG. 5) such that the various control, equipment, and other devices are configured to communicate over a "plug-and-play" network. In some embodiments, this includes simple installation with wireless connectivity between equipment devices and control devices. In other embodiments, this includes a communications network with specific protocols for communicating within the network. The plug-and-play network may be similar to the networks disclosed in U.S. patent application Ser. No. 16/153,537 filed Oct. 5, 2018, the entire disclosure of which is incorporated by reference herein.

SBH gateway 402 is shown to include COP client 404, UI server 406, capability provider 408, MUDAC 410, and device process 412. Device process 412 is shown to include BACnet network layer 414, BACnet IP data link 416, BACnet MSTP data link 418, BACnet device object 420, and data cache 422. In some embodiments, the various processes and modules shown within SBH gateway 402 are configured to collect COV data from various controllers (e.g., $3^{rd}$ party controllers 424, smart equipment controllers 426) and provide the data to a server (e.g., cloud, digital vault, etc.) for future processing. In some embodiments, SBH gateway 402 is configured to configure $3^{rd}$ party controllers 424 such that $3^{rd}$ party controllers 424 are capable of operating under the network used by smart equipment controllers 426. This is shown in greater detail with reference to FIG. 5.

Figure 4B:
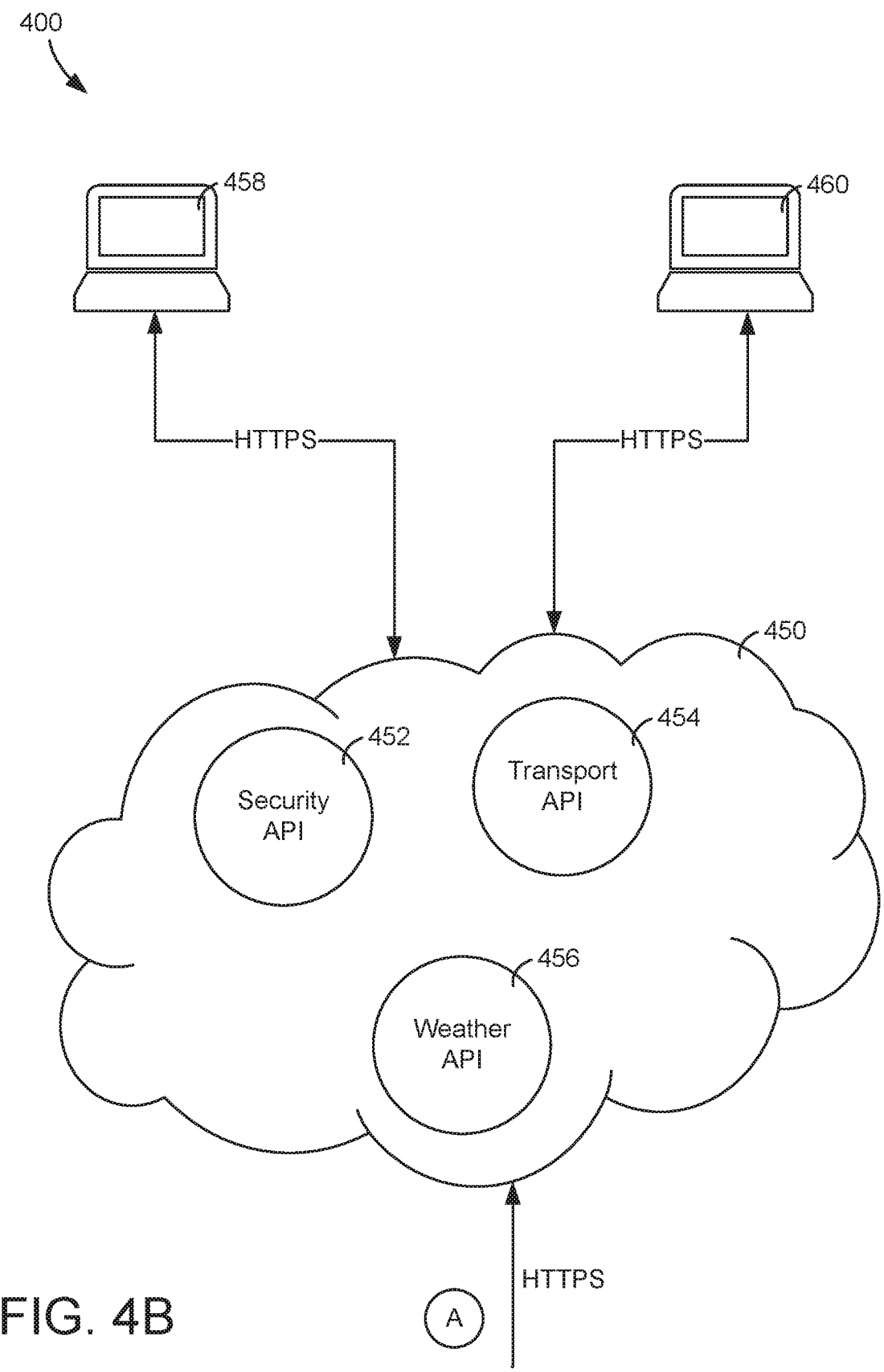

Referring now to FIG. 4B, system 400 for integrating a 3rd party device into a network is shown, according to an exemplary embodiment. FIGS. 4A-B show SBH gateway 402 connected to cloud 450 via HTTPS. In some embodiments, SBH gateway 402 includes a communications interface that allows the gateway to connect to various internetworks (e.g., the Internet, the cloud, etc.) such that SBH gateway 402 may provide and receive data via one or more servers that are located off-premise (e.g., at a different location than building 10).

Cloud 450 may be any type of data storage medium (e.g., data centers, servers, etc.) configured to receive data over a network and process/store applications for clients. In some embodiments, cloud 450 is a digital vault as provided by Johnson Controls, Inc. The methods of cloud 450 may be similar to those described in U.S. patent application Ser. No. 16/775,032 filed Jan. 28, 2020, the entire disclosure of which is incorporated by reference herein. Cloud 450 is shown to include various API's (e.g., security API 452, transport API 454, weather API 456) that may act as a system of tools or resources to enable the creation of software applications. Cloud 450 is shown communicating with user devices 458,460 via a network communication (e.g., HTTPS). In some embodiments, user devices 458, 460 will request information from cloud 450 relating to system 400, such as device information relating to $3^{rd}$ party controllers 424. In other embodiments, user devices 458,460 write data to object to properties of $3^{rd}$ party controllers 424, such as changing the device name or device type via SBH gateway 402.

Referring now to FIG. 5, a system 500 for connecting $3^{rd}$ party devices to a pre-established smart network is shown, according to an exemplary embodiment. System 500 may be configured to show how a supervisory controller (e.g., smart building hub (SBH) 504, etc.) configures $3^{rd}$ party devices (e.g., controllers that are not configured to operate in a smart network). System 500 is shown to include user device 502, SBH 504, network 506, and equipment devices 508-512.

User device 502 may be any type of user device (e.g., phone, tablet, laptop, workstation) capable of providing communication to SBH 504, or other devices in system 500. User device 502 is shown to be connected via building automation controls network (BACnet) over Ethernet. In some embodiments, system 500, and other systems within the BMS of building 10, operate in accordance with a building automation standard, such as BACnet. BACnet includes various forms of network communication, including BACnet/Ethernet, BACnet/MSTP, and BACnet/IP. BACnet/Ethernet may include user interface 502 connected at the physical layer (e.g., cabling, etc.) with Ethernet while networking data in accordance with BACnet protocol. User device 502 is not limited to connect to SBH 504 via BACnet/Ethernet and may be connected wirelessly (e.g., BACnet/IP, etc.).

Equipment devices 508-512 include zone coordinator 508, field controller 510, and VAV controller 512 and are shown to communicate with SBH 504. For example, zone coordinator 508 may provide properties of zone coordinator 508 (e.g., properties of data objects, data objects, operational parameters, measurements from sensors measuring parameters of zone coordinator 508, points, BACnet points, etc.). Equipment devices 508-512 are shown to be connected to SBH 504 via BACnet/MSTP. In some embodiments, equipment devices 508-512 have a wired connection to SBH 504 (e.g., RS485 wiring).

Network 506 may be a medium for which data packets or datagrams can travel from a network for $3^{rd}$ party devices to another network location. For example, network 506 facilitates data traffic from BACnet standard devices (e.g., RTU controller 514) and provides information relating to RTU controller 514 to network 506 for processing. $3^{rd}$ party devices may include RTU controller 514, TEC controller 516, and zone coordinator 518. $3^{rd}$ party devices 514-518 may follow the same building automation protocol standard (e.g., BACnet, etc.) as other devices in system 500 (e.g., zone coordinator 508), but may not be configured to operate in the control system established during installation.

For example, all devices in system 500 follow BACnet protocol and communicate over BACnet/Ethernet, BACnet/MSTP, and/or BACnet/IP. As such, devices in system 500 may request services (e.g., information exchange requests) from objects (e.g., an abstract representation of a device, input, or output), such that the properties of objects in system 500 are read/written to satisfy requests. Prior to a configuration, SBH may provide a service request to RTU controller via network 506 to read 3 properties of RTU controller 514 (e.g., operational temperature, current draw, operating voltage). RTU controller 514 is incapable of satisfying the request, as RTU controller 514 is not configured to communicate in the control system established by SBH 504. In other words, SBH 504 may be a pre-established control system (e.g., VERASYS®) that includes specific networking protocols that, while following BACnet standards, are unknown to RTU controller 514. As such, SBH 504 may configure RTU controller 514, upon determining that RTU controller is a $3^{rd}$ party device, so RTU controller 514 may receive and/or provide services in system 500.

In some embodiments, discovering $3^{rd}$ party devices via BACnet/MSTP into SBH 504 is automatically performed by SBH 504. In some embodiments, discovering $3^{rd}$ party BACnet/IP devices into SBH 504 is automatic after a discovery process is complete. In such an embodiment, a user my have the option to disable automatic discovery for BACnet/IP. This may be done to prevent any unnecessary broadcast traffic from SBH 504. In some embodiments, a default profile of the $3^{rd}$ party BACnet/IP devices or $3^{rd}$ party BACnet/MSTP devices are generated. The default profiles may include various default information, including device model or device vendor. Additionally, the default profile, which may be presented to a user, may include the ability to write to all properties (e.g., points) of the device profile irrespective of whether the point is writable or not. The user interface may then display appropriate errors for any write failures. In some embodiments, a complete profile is generated after configuration is complete.

In a general embodiment, these device profiles may be presented on a device list to the user interface. The user can then navigate to the default view and setup/associate a more advanced profile that enables the specific features on the discovered device (e.g., specific features to a control system such as VERASYS®, etc.). Configuration of the device may be manual or automatic and converting the profile from a default profile to the completed profile after configuration may be manual or automatic. The various methods for generating and displaying profile information is described in greater detail below with reference to FIGS. 7-10.

Figure 6A:
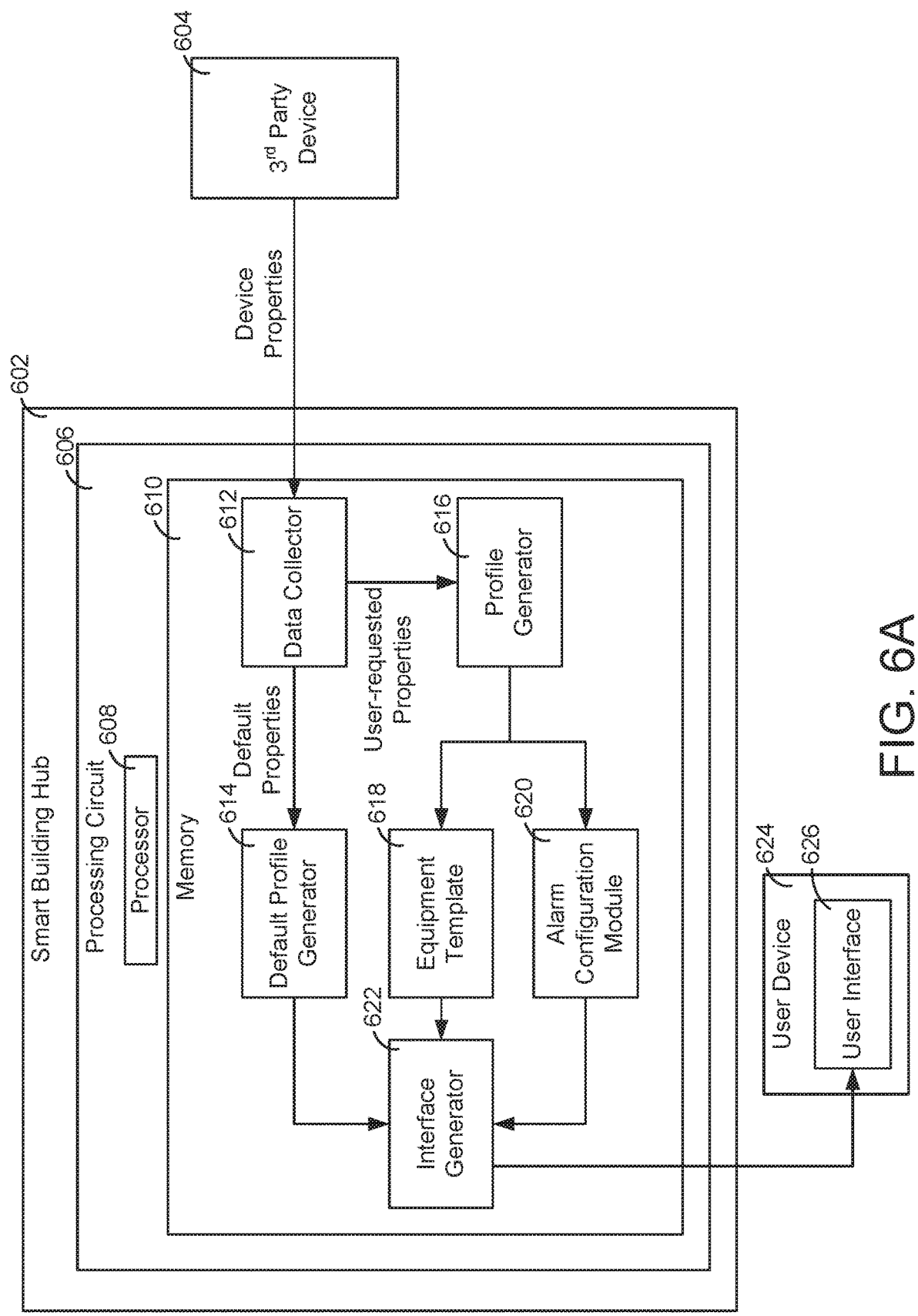
FIGS. 6A-B are block diagrams of a smart building hub (SBH), which can be used in the system of FIG. 5, according to some embodiments.

Referring now to FIG. 6, a block diagram of smart building hub (SBH) 602 for configuring $3^{rd}$ party devices is shown, according to exemplary embodiments. FIG. 6A is shown to include SBH 602, $3^{rd}$ party device 604, and user device 624 including user interface 626. SBH 602 may be substantially similar or identical to SBH 504. In a general embodiment, SBH 602 receives property information relating to $3^{rd}$ party device 604 and generates a profile based on the device properties. $3^{rd}$ party device 604 may be connected to SBH 602 via BACnet/MSTP, BACnet/IP, or any other BACnet communications bus. SBH 602 is shown to include processing circuit 606. Processing circuit 606 is shown to include processor 608 and memory 610.

Processing circuit 606 can be communicably connected to a communications interface such that processing circuit 606 and the various components thereof can send and receive data via the communications interface. Processor 608 can be implemented as a general purpose processor, an application specific integrated circuit (ASIC), one or more field programmable gate arrays (FPGAs), a group of processing components, or other suitable electronic processing components.

Memory 610 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 610 can be or include volatile memory or non-volatile memory. Memory 610 can include database components, object code components, script components, or any other type of information structure for supporting the various activities and information structures described in the present application. According to an example embodiment, memory 610 is communicably connected to processor 608 via processing circuit 606 and includes computer code for executing (e.g., by processing circuit 606 and/or processor 608) one or more processes described herein. Memory 610 is shown to include data collector 612, default profile generator 614, profile generator 616, equipment template 618, alarm configuration module 620, and interface generator 622.

Data collector 612 may be any means of collecting data wired or wirelessly. This may be performed via a communications interface that can facilitate communications between $3^{rd}$ party device 604, SBH 602, and various devices within building 10. In some embodiments, data collector may store data in one or more databases (not shown in FIG. 6A). Data collector 612 is shown to receive device properties from $3^{rd}$ party device 604, including default properties and user-requested properties. In some embodiments, properties, as used herein, may refer to information about a BACnet object. Objects (e.g., BACnet objects, etc.) may contain a large collection of properties, some of which may be required for the specific object type. In some embodiments, every BACnet object has at least three properties: an identifier object (e.g., device ID, etc.), an object name, and an object type. In the examples described above, one method for why SBH 504 is unable to write to properties of RTU controller 514 prior to configuration may be that the data exchange format between devices in system 500 is different than what RTU controller 514 is programmed for, such that writing a property of an unconfirmed BACnet object engages two distinctly separate data interchange formats (e.g., different JSON implementations, etc.). Data collector 612 is shown to provide default properties to default profile generator 614.

Default profile generator 614 is configured to receive default properties of $3^{rd}$ party device 604 and generate a default profile (e.g., model) of $3^{rd}$ party device 604. In some embodiments, the $3^{rd}$ party devices are known (e.g., the model and vendor information is provided to SBH 602, either prior to or after discovery, etc.) and may be pre-shipped with SBH 602. In such an embodiment, there may be predefined profiles available for known $3^{rd}$ party devices that can be imported to make the configuration process (e.g., mapping process) more efficient. In other embodiments, the devices are not know and little to no information may be collected and provided to default profile generator 614 for generating a default model, prior to configuration.

In some embodiments, a default profile (e.g., predefined profile) consists of a data model template, a data model view definition, a partially configured equipment object instance and corresponding metadata files that contain mapping information for specific vendor/model associations. The profile may optionally contain the event list and event generator objects responsible for generating smart equipment style alarms from the discovered points on the $3^{rd}$ party devices based on the alarm configuration provided.

In some embodiments, default profile generator 614 generates a predefined profile that may include but is not limited to: a home page, inputs (e.g., AI, BI, MI, etc.), outputs (e.g., AO, BO, MO, etc.), parameters (e.g., AV, BV, MV, etc.), schedules, trends, and a widget to create the completed profile (e.g., actual profile, post-configuration profile, etc.) for $3^{rd}$ party device 604. In some embodiments, the user may choose to organize the various properties on the profile. For example, each property may belong to a single group/view, or several properties may belong to one or more groups/views. Data collector 612 is further shown to provide user request Profile generator 616 may be configured to generate the completed profile of $3^{rd}$ party device 604. In some embodiments, once the profile is generated (e.g., generated via user instruction), the user can select and organize the points (e.g., properties) in a more structured or detailed menu. For example: Home, Status, Summary, Commissioning, Controller, and Details. In some embodiments "Controller" group and "Details" group contain the basic device attributes and the other points received after configuration, respectively. In some embodiments, the menu may include, set schedules, trends, alarms, and/or other profiles.

Equipment template 618 may be configured to store various properties of BACnet objects in system 500, including properties of $3^{rd}$ party device 604. In some embodiments, equipment template 618 includes rows and columns for storing properties of $3^{rd}$ party device 604 to engage or assist in configuration. For example, while $3^{rd}$ party device 604 may not be configured to operate in a system that is pre-stablished and "smart" (e.g., system 500), $3^{rd}$ party device may still provide BACnet objects relating to $3^{rd}$ party device 604 or other devices below device 604 (e.g., lower-level controllers, etc.). The received properties from one or more objects may be populated in equipment template 618 in a similar fashion as is done with other BACnet device objects in system 500 that are configured. Equipment template 618 may them map the various properties of $3^{rd}$ party device 604 such that SBH 602 is able to configure $3^{rd}$ party device 604. SBH 602, now understanding how $3^{rd}$ party device exchanges data and provides object data, may transform or configure the data exchange format between the two devices.

Alarm configuration module 620 may be configured to generate a process for providing alarms to $3^{rd}$ party device 604. Alarm configuration module 620 may assist in the configuration of $3^{rd}$ party device 604 by allowing alarm services (e.g., notifications, updates, etc.) to be provided and received between SBH 602 and $3^{rd}$ party device 604. Alarm configuration module 620 is discussed in greater detail below with reference to FIG. 6B.

Interface generator 622 may be configured to generate an interface for user device 624. Interface generator 622 may generate a navigation pane that includes a default profile, a completed profile, and/or any information relating to such. In some embodiments, interface generator includes various navigation branches that allow a user to navigate through different device information in system 500. Various embodiments of user interfaces generated by interface generator 622 and provided to user device 624 are described in greater detail below with reference to FIGS. 7-10.

Figure 6B:
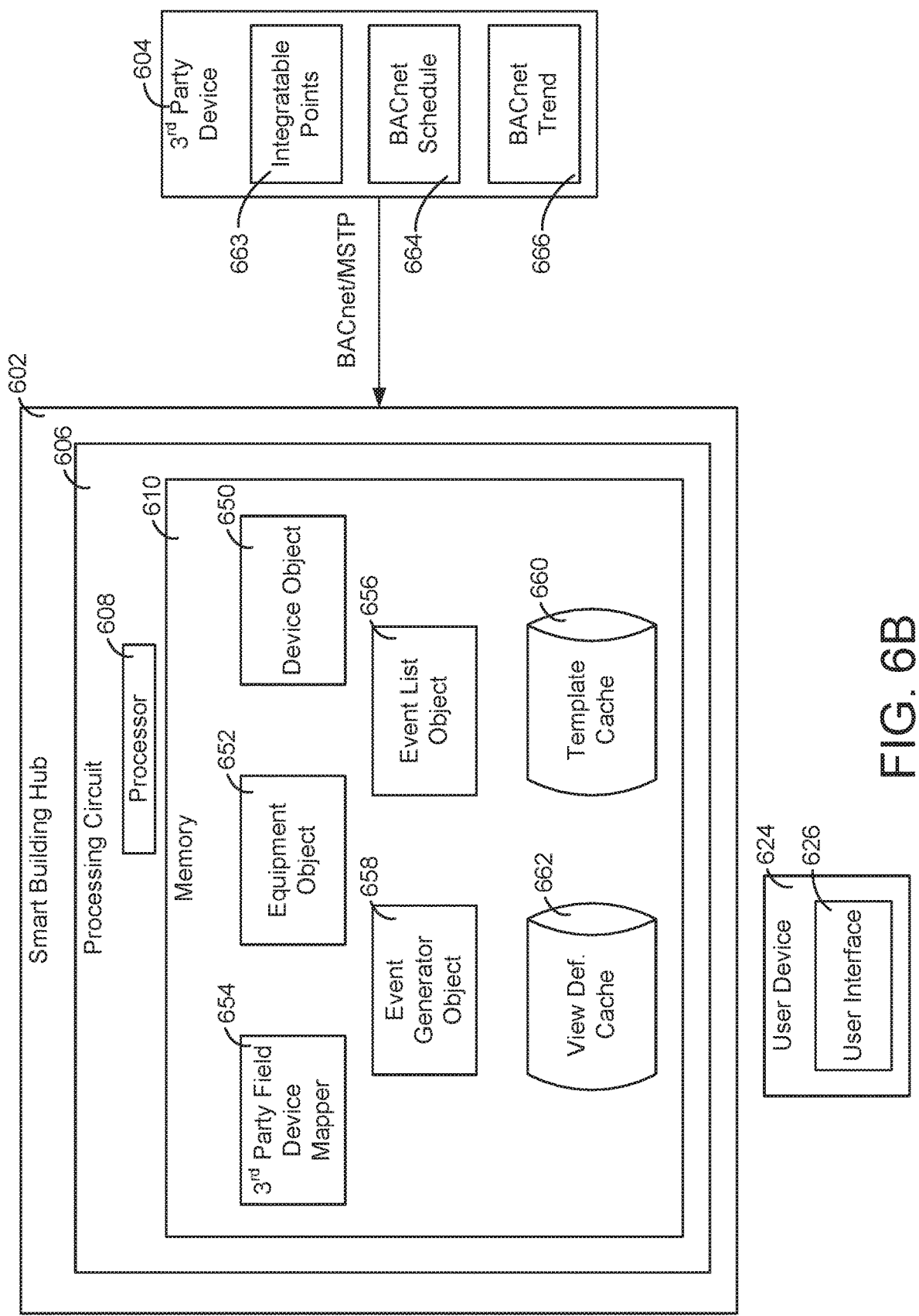

Referring now to FIG. 6B another embodiment of a block diagram of smart building hub (SBH) 602 for configuring $3^{rd}$ party devices is shown, according to exemplary embodiments. $3^{rd}$ party device 604 is shown to include integrable points 663 (e.g., BACnet objects, AV, AI, AO, etc.), BACnet schedule 664, and BACnet trend 666. Additionally, memory 610 of SBH 602 is shown to include device object 650, equipment object 652, $3^{rd}$ party field device mapper 654, event list object 656, event generator object 658, template cache 660, and view definition cache 662.

In a general embodiment, SBH 602 discovers $3^{rd}$ party device 604 due to a change in the BACnet/MSTP datalink (e.g., via an active node table, by user initiated disclosure, etc.). 3rd party field device mapper 650 reads data from device object 650 and creates poll mappers for each of the objects received (e.g., AV, AI, AO, etc.). $3^{rd}$ party field device mapper 654 then reads the vendor and model information of $3^{rd}$ party device 604. If recognized by SBH 602, SBH 602 automatically associates the corresponding profile with $3^{rd}$ party device 604. This may include previously stored profiles that were generated for devices with the same vendor/model. This may be performed by populating a template in the $3^{rd}$ party field device mapper 654 and configuring with known points, schedules or trends. The user may then see a new device (e.g., $3^{rd}$ party device 604). When the user clicks on the new device via a widget on user interface 626, the user is presented with a default view with default menu structures that list the discovered points as a default flat list, including: a "Points List" view, a "Set Schedule" view, and a "Trend" view. A create/edit profile menu may then be added to enable the user to create a full-fledged customized profile for $3^{rd}$ party device 604.

The user is indicated of the default view (e.g., default profile) and creating a profile is recommended to take advantage of all of the features that the control system (e.g., system 500, system 200, VERASYS®, etc.) offers. When the user selects to create a profile, the user chooses objects or points to bring into equipment object 652, defines the template information and assigns identification (ID) criteria.

The user also defines if alarming is required and configures alarm information for each chosen property. The user may also assign the property one of the predefine view menus. The user may then choose BACnet trend 666 and BACnet schedule 664 to include in the view definition configuration (e.g., in the completed profile). When the user is finished with picking the object attributes and its template information and alarm configuration, SBH 602 updates the template in $3^{rd}$ party field device mapper 654 with the new property and adds the property to a view in a data model viewed in $3^{rd}$ party field device mapper 654. SBH 602 may then configure the data in equipment object 652, event generator object 658, and event list object 656.

In some embodiments, mapping (e.g., configuration, etc.) involves associated $3^{rd}$ party device 604 with a profile, wherein $3^{rd}$ party device 604 has been previously associated with a profile. If $3^{rd}$ party device 604 has been previously associated with a profile, SBH 602 may then automatically associate the discovered $3^{rd}$ party device 604 with the previously associated profile and display information to the user based on the associated profiles view definition. In some embodiments, the existing profiles are matched with the Vendor ID, model name, and/or firmware version to search for the best matched profiles. For example, if there is only a single profile that matches all three parameters above then the profile shall be automatically associated, otherwise the user can choose from the various matching profiles to associate one of the to the device.

In other embodiments, $3^{rd}$ party device 604 may not be previously associated with a profile. In such an embodiment, the user must manually associate the device with a profile for each discovered $3^{rd}$ party device 604. In some embodiments, this is a one-time configuration, required at the time of commissioning (e.g., configuring, etc.) $3^{rd}$ party device 604.

In some embodiments, the user may remove an offline device using a "remove offline" widget on user interface 626. In such an embodiment, the removed profile association shall be cleared. In some embodiments, the profile will still exist on SBH 602 such that if the same device is connected back, the user can select the existing profile from the list and associate the profile.

Figure 7:
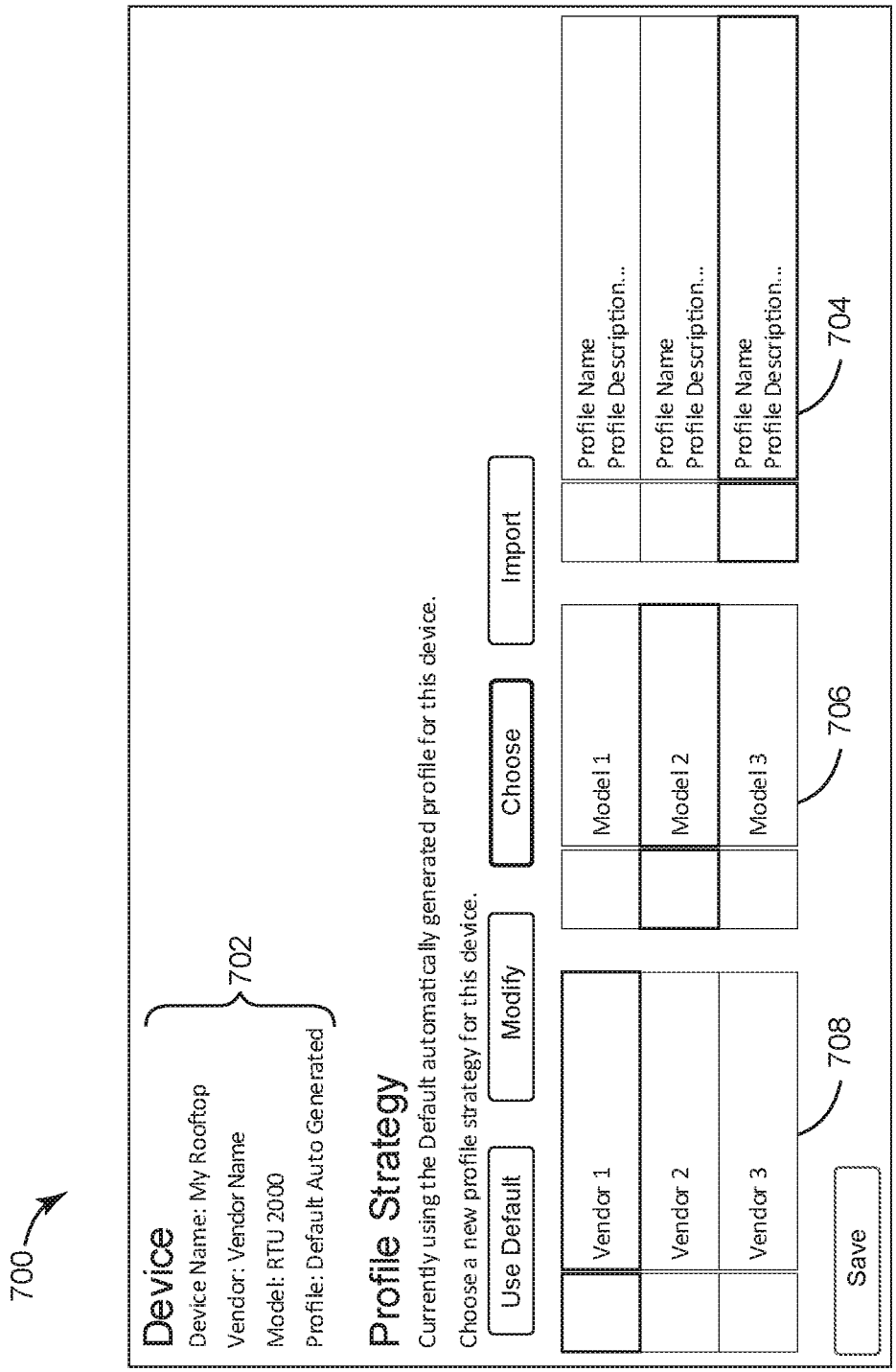

Referring now to FIGS. 7-10, various interfaces for displaying information relating to configuring $3^{rd}$ party device 604 and other devices in system 500 is shown, according to exemplary embodiments. FIG. 7 is shown to include interface 700. Interface 700 is shown to include header information 702, profile information 704, model information 706, and vendor information 708. Interface 700 may be configured to display the various profiles generated for the devices configured to operate within system 500. In some embodiments, a user may choose from several profiles for more detail. The profiles can be devices that were already configured for system 500, $3^{rd}$ party devices, or any combinations thereof.

Figure 8A:
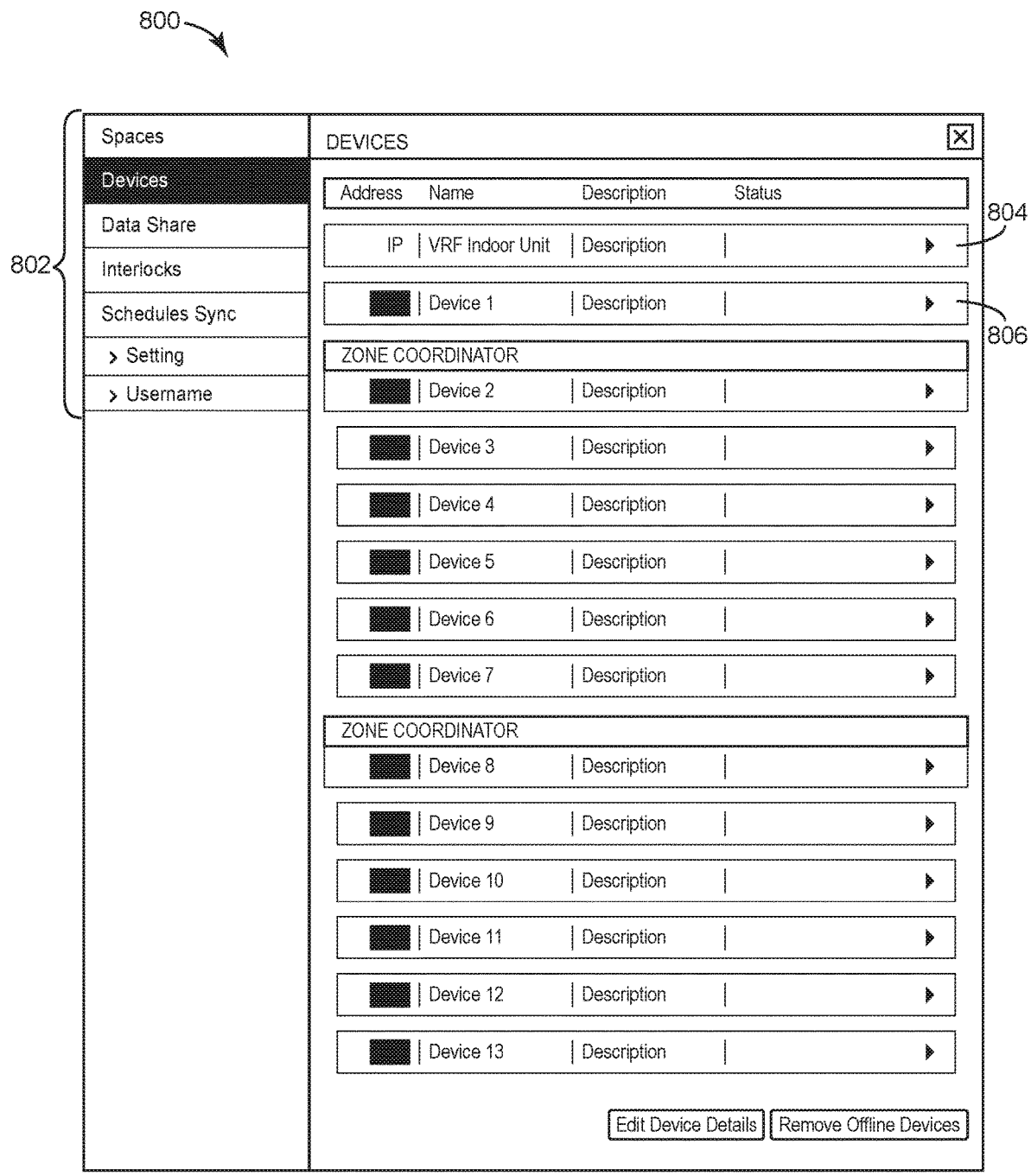

Referring now to FIG. 8, an interface for displaying various devices in system 500 is shown, according to exemplary embodiments. Interface 800 is shown to include navigation tree 802, $3^{rd}$ party device 804 and configured device 806. Interface 800 may display both configured devices and devices that are not yet configured, but have been discovered. For example $3^{rd}$ party device 804 is shown to include an "IP" symbol, indicating that the device has been discovered via BACnet/IP. Navigation tree 802 may allow a user to scroll through different information relating to the device profiles, including trends, scheduling, interlocks, and others.

Figure 8B:
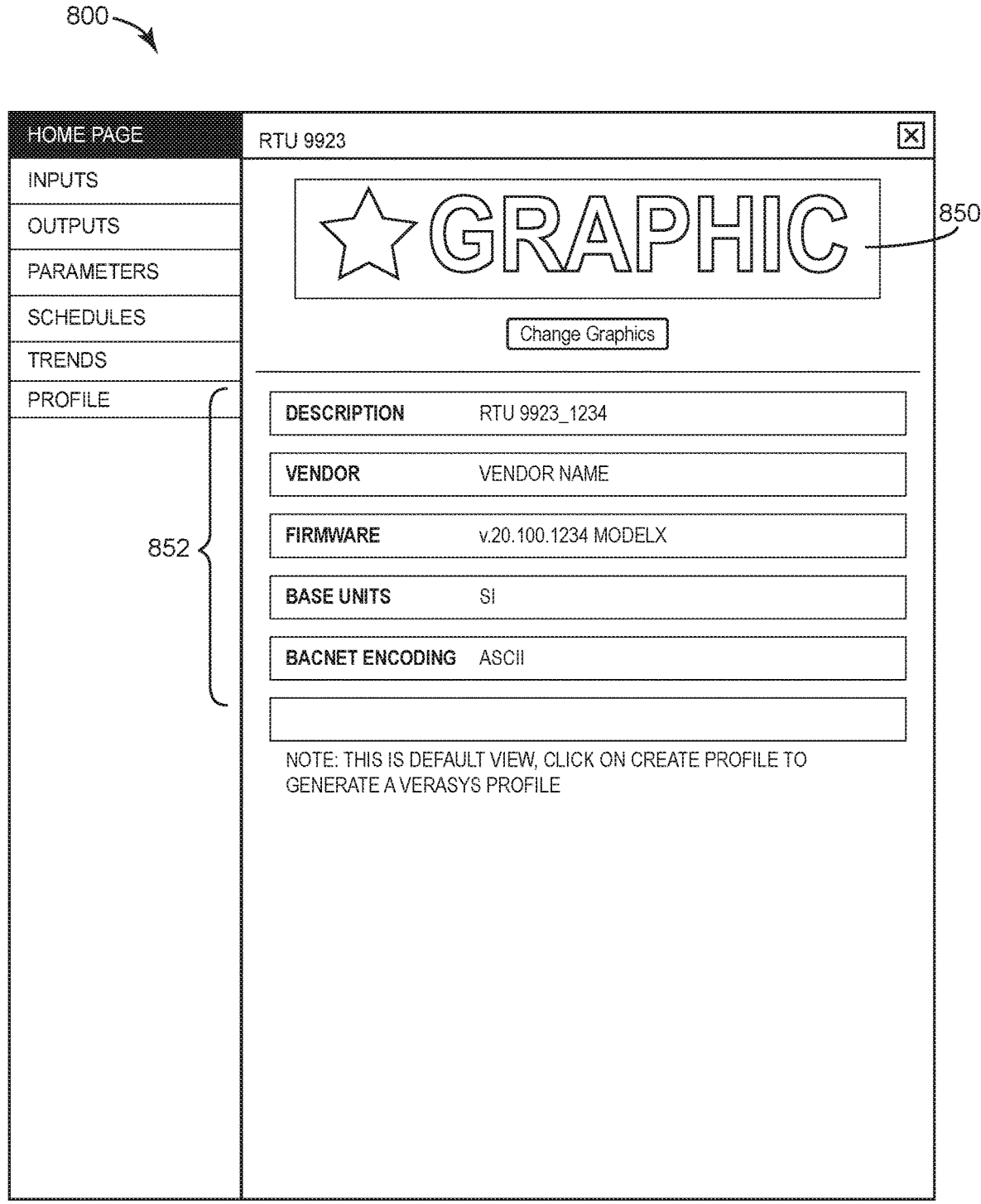

Referring now to FIG. 8B, an interface 850 for displaying device information is shown, according to some embodiments. Interface 850 is shown to include default points 852. Interface 850 may be generated by default profile generator 614 as shown in FIG. 6A after a device has been discovered, but not yet configured. In such an embodiment, interface 850 may display only the points that are receivable, including vendor information, model information, and/or firmware information. To generate a configured profile, a user may have to engage a widget on interface 850 to generate a profile for the device.

Referring now to FIG. 9, an interface 900 for updating a profile is shown, according to some embodiments. Interface 900 is shown to include header information 902, point information 904, 906, write indicator 908, homepage indicator 910, use ID's indicator 912, and alarm indicator 914. Points 904, 906 may allow a user to change the point connects between SBH 602 and $3^{rd}$ party device 604. For example, point 904 may be a first analog value (AV1) of SBH 602 set to match a first analog value (AV1) of $3^{rd}$ party device 604. Write indicator 908 may indicate whether the user is allowed/able to write information to the device, including point data. Homepage indicator 910 may indicate whether profile information related to this device is located on the homepage of the user interface. Use ID's indicator 912 may assign various ID's to the device connections. Alarm indicator 914 may allow the user to set an alarm based on the respective point connection.

Figure 10:
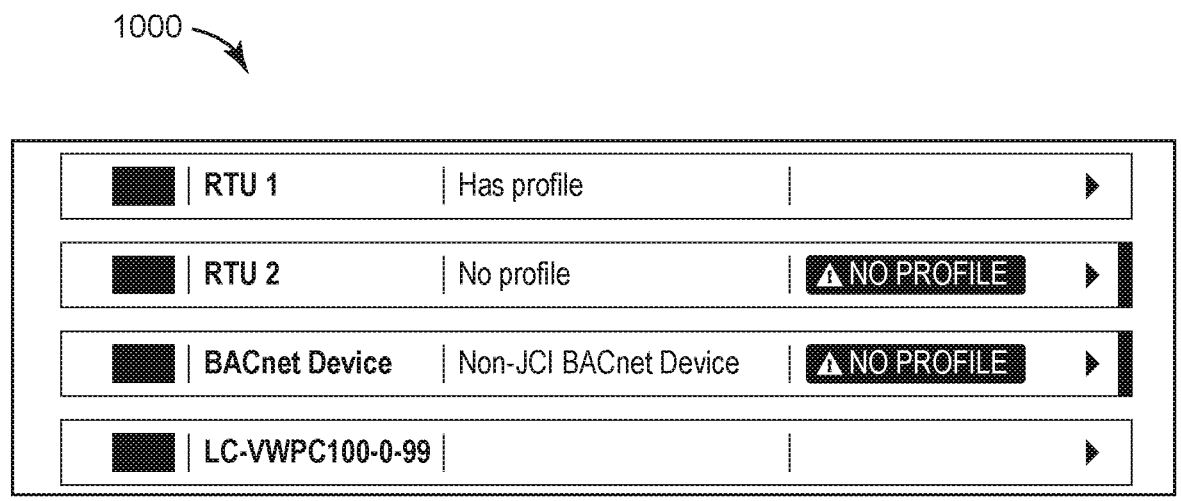

Referring now to FIG. 10, an interface 1000 is shown for displaying devices that may or may not have a generated profile, according to some embodiments. Interface 1000 shows "BACnet Device" with a no profile indicator and as a "Non-JCI BACnet Device." This may indicate that the BACnet device has not been configured and it is a $3^{rd}$ party device. Interface 1000 is also configured to profiled devices, such as "Lennox RTU 1."

Device Integration Processes

Figure 11:
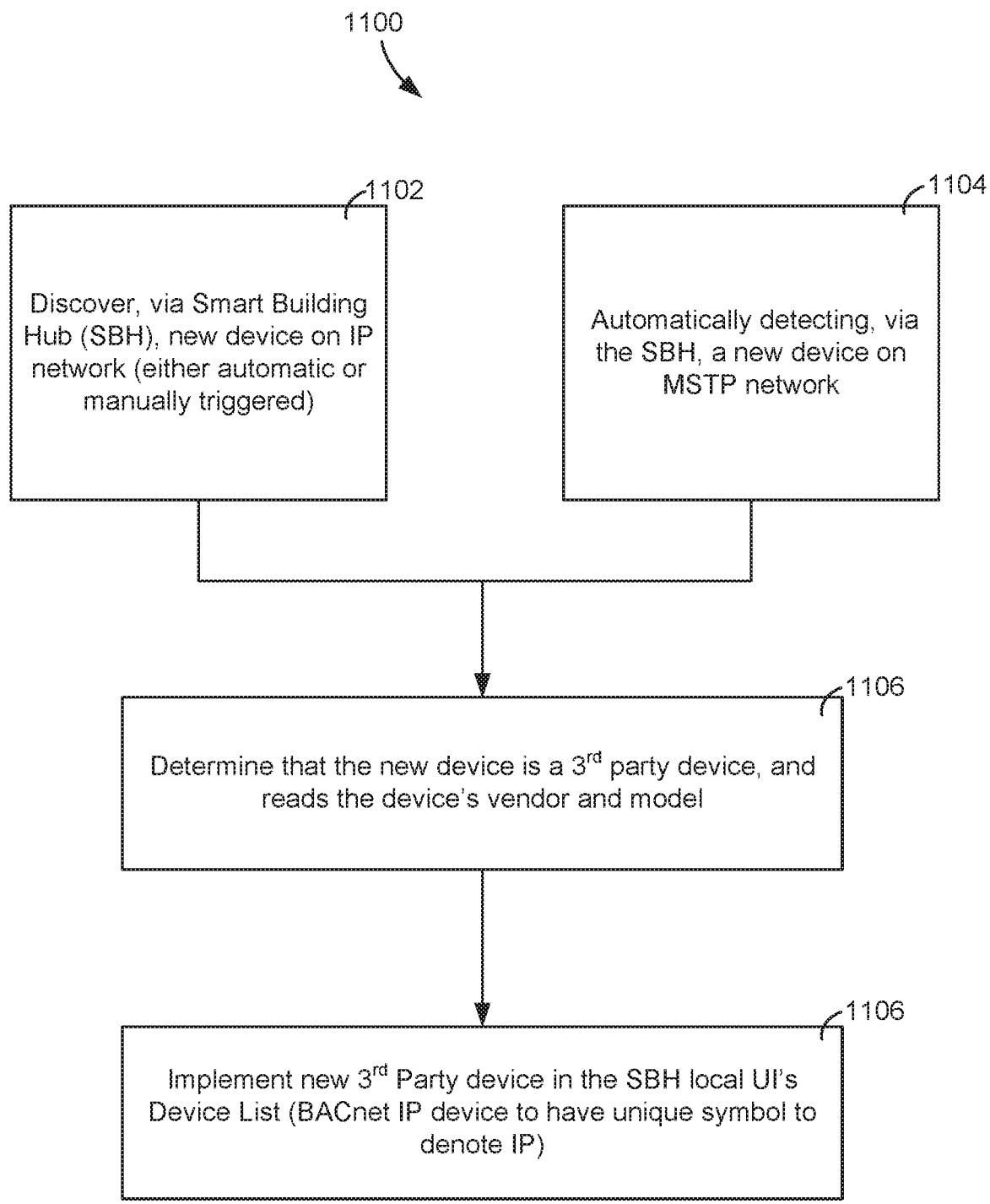
FIGS. 11-12 are flow diagrams for processes for configuring third-party devices for a control system which can be implemented by the SBH of FIGS. 6A-B, according to some embodiments.

Referring now to FIG. 11, a process 1100 for configuring $3^{rd}$ party devices is shown, according to some embodiments. Process 1100 may be performed by SBH 602 as shown in FIGS. 6A-B. Process 1100 is shown to include discovering, via Smart Building Hub (SBH), a new device on IP network (either automatic or manually triggered) (operation 1102).

Process 1100 is shown to include automatically detecting, via the SBH, a new device on the MSTP network (operation 1104). This may be shown in FIG. 5, wherein SBH 504 discovers $3^{rd}$ party device zone coordinator 518 connected via the BACnet/MSTP network. In some embodiments, this process is performed automatically after a device connects to SBH, either via BACnet/MSTP or BACnet/IP. In some embodiments, SBH 504 detects devices that are on the IP network rather than the MSTP network, such as RTU controller 514 as shown in FIG. 5.

Process 1100 is shown to include determining that the new device is a $3^{rd}$ party device, and reads the device's vendor and model (operation 1106). This operation may be performed by SBH 602. In some embodiments, SBH 602 will be unable to provide certain control features that only pertain to the control system in which SBH 602 is operating in. In the event that SBH 602 discovers the device (e.g., $3^{rd}$ party device 604) and attempts to read its points, it may only be able to receive limited device information, such as vendor and model information.

Process 1100 is shown to include implementing a new $3^{rd}$ Party device in the SBH local UI's Device List (e.g., BACnet/IP device to have unique symbol to denote IP) (operation 1108). This operation may include updating a user interface (e.g., user interface 626) such that a user is able to see preliminary details (e.g., connection type, device type, etc.) after SBH 602 discovers the new $3^{rd}$ party device.

Figure 12:
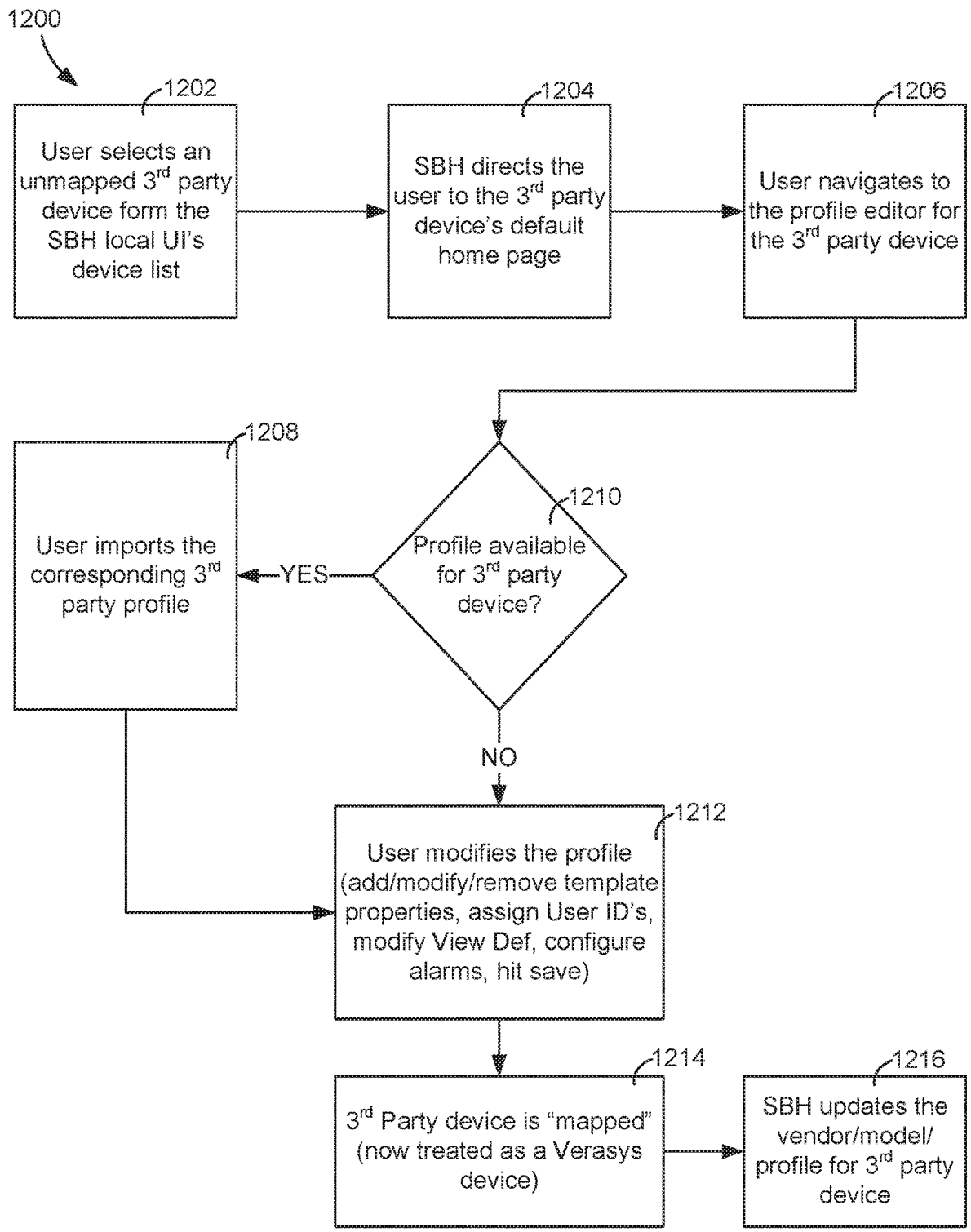

Referring now to FIG. 12, a process 1200 for configuring $3^{rd}$ party devices is shown, according to exemplary embodiments. Process 1200 may be performed by SBH 602 as shown in FIGS. 6A-B. Process 1200 is shown to include a user selecting an unmapped $3^{rd}$ party device from the SBH local UI's device list (operation 1202). In some embodiments, operation 1202 occurs after SBH discovers $3^{rd}$ party device 604. Operation 1202 includes a user selecting a device from a user interface to determine information relating to its profiles.

Process 1200 is shown to include SBH directing the user to the $3^{rd}$ party device's default home page (operation 1204) and navigating to the profile editor for the $3^{rd}$ party device (operation 1206). Additionally, process 1200 includes determining if the profile is available for the $3^{rd}$ party device (operation 1210). Operations 1204-1208 may include the user navigating the user interface to determine whether a profile (e.g., configured profile, etc.) is available such that a user may implement the device profile to monitor more features related to the device. In some embodiments, a configured profile may only be available after configuration, as described with reference to FIGS. 6A-B.

In the event that the profile is available, process 1200 is shown to include a user importing the corresponding $3^{rd}$ party profile (operation 1208). This operation may simply include receiving (e.g., downloading, etc.) the configured profile for the 3rd party device (e.g., $3^{rd}$ party device 604. In the event that the profile is not available for the $3^{rd}$ party device, process 1200 is shown to include modifying the profile (e.g., add/modify/remove template properties, assign user ID's, modify view model definition, configure alarms, hit safe, etc.) (operation 1212).

Process 1200 is shown to include determining that the $3^{rd}$ party device is mapped (operation 1214). SBH 602 may configure $3^{rd}$ party device 604 by mapping various points (e.g., properties, etc.) from $3^{rd}$ party device 604 such that a template may be populated inside the processing of SBH 602 allowing $3^{rd}$ party device 604 to operate in system 500 as a configured device. This operation is described in detail with reference to FIGS. 6A-B. Process 1200 is shown to include updating the profile for the $3^{rd}$ party device (operation 1216). Operation 1216 may be performed by a user after configuration is complete. In some embodiments, a user may want to edit a profile of a device, similar to the profile editing as shown in FIG. 9.

In some embodiments, the profile generated by SBH 604 may be stored on SBH 604 and provided to user devices (e.g., user device 624, etc.) upon request. In other embodiments, the profile is provided to user device 624 to be stored thereon. This may be done locally. For example, a user device may be connected to SBH 604 via a wired connection (e.g., BACnet/IP, etc.). SBH 604 may provide the profile via the Ethernet connection to be stored on user device 624. In other embodiments, the profile is provided via an internetwork (e.g., cloud, enterprise cloud, etc.). In such embodiments, the profile may be stored/processed and provided to user device 624 as a software as a service (Saas) or other type of cloud-based application. In other embodiments, the profile is generated and provided to user device 624 to be stored thereon. In some embodiments, these profiles can be saved off of the cloud (e.g., cloud 450) from a site and provided to a different site across different sites, including enterprise connected sites.

In some embodiments, cloud 450 may be configured to receive profiles generated by SBH 604 and provide the profiles across several sites (e.g., building networks, other building locations, other building networks, other networks with a separate SBH, etc.). In some embodiments, all processing for configuring $3^{rd}$ party devices may be stored in a cloud computing service (e.g., cloud 450, etc.) such that the user devices that may be connected locally or inter-site (e.g., across different sites, across different buildings, etc.) may be able to use, display, and/or control SBH 604 and other controllers from an enterprise UI (e.g., a cloud-based user interface, etc.) across multiple sites.

Figure 13A:
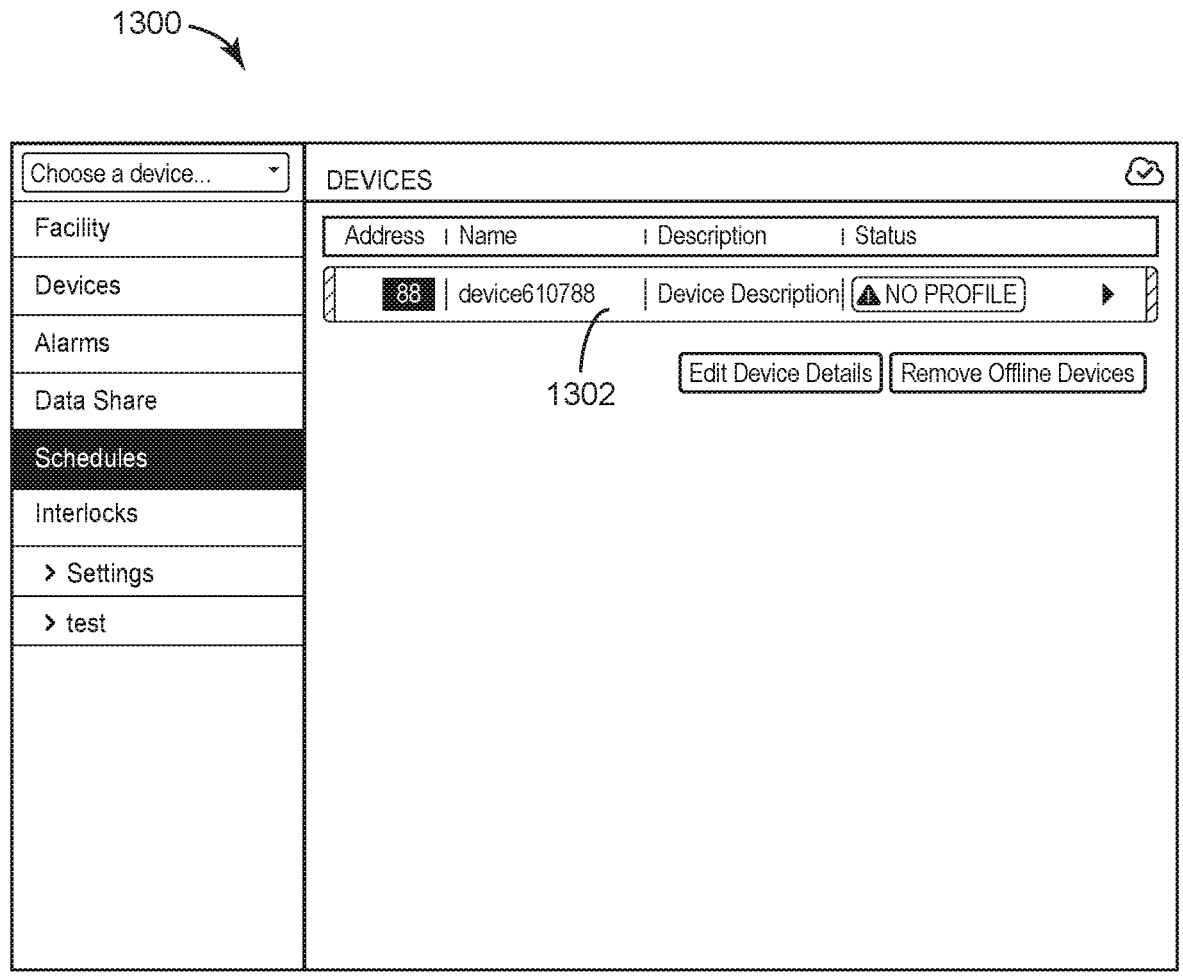
FIGS. 13A-G are various interfaces for displaying information related to configuring third-party devices for a control system which may be used in the system of FIG. 5, according to some embodiments.

Referring now to FIGS. 13A-G, various embodiments related to generating profiles for $3^{rd}$ party devises are shown, according to exemplary embodiments. FIGS. 13A-G show interface 1300 in different embodiments. The various interfaces shown in FIGS. 13A-G (e.g., interface 1300) may be shown in user devices within system 500 (e.g., device 502). Referring now to FIG. 13A, interface 1300 for displaying profiles is shown, according to an exemplary embodiment. Interface 1300 shows device window 1302 titled "device 1610788." In some embodiments, interface 1300 is displaying a device list with no profiles. Device window 1302 may be engaged by a user to see a default profile of the device.

Figure 13B:
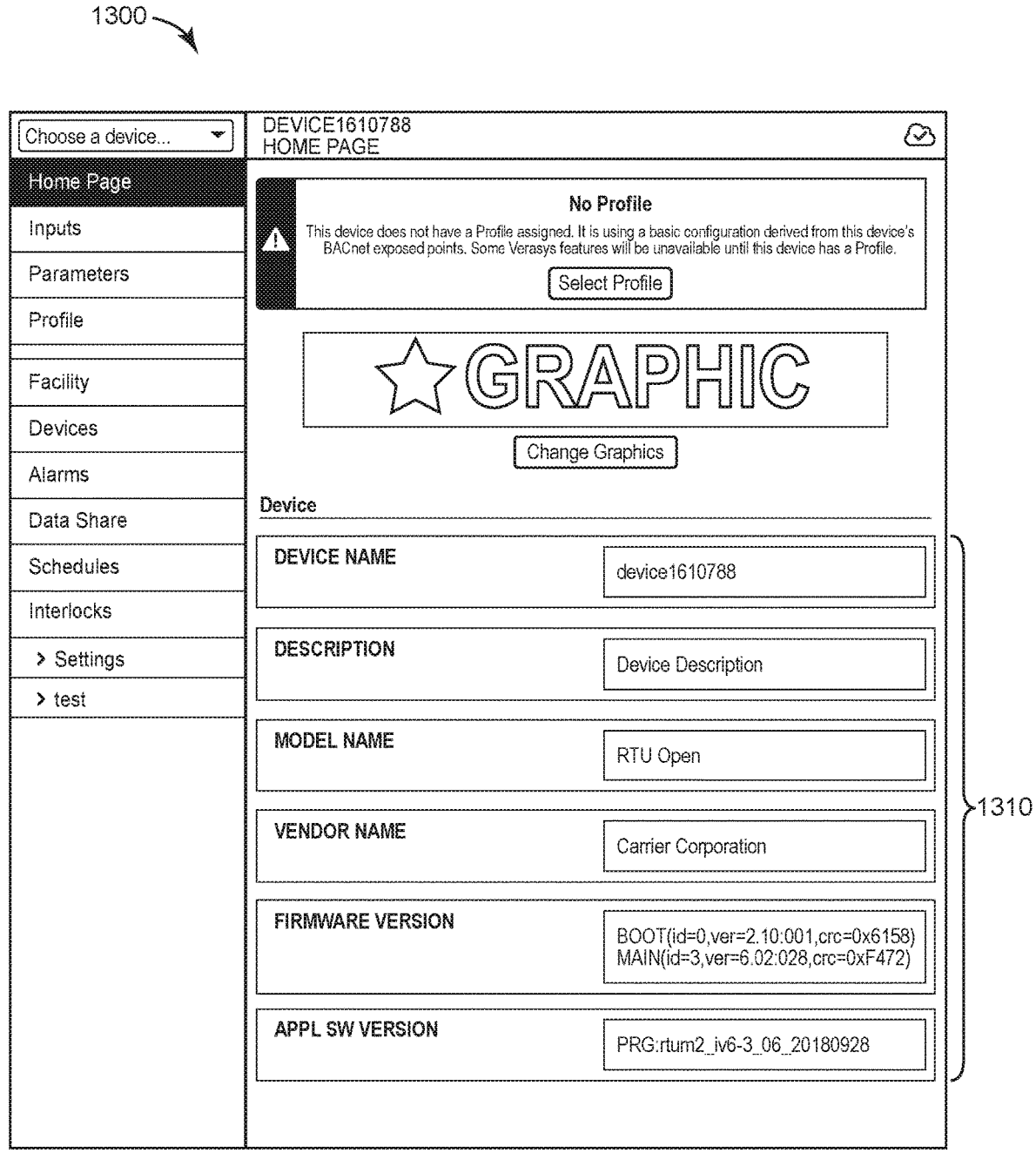
Figure 13C:
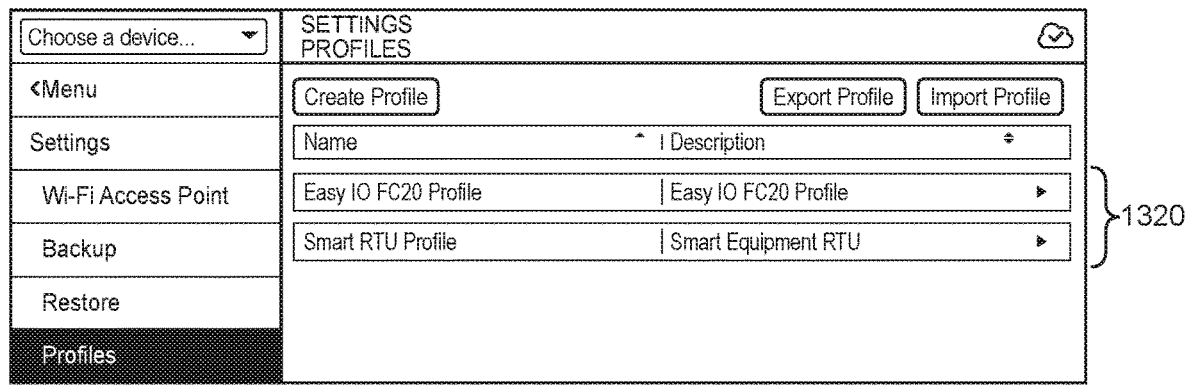
Figure 13D:
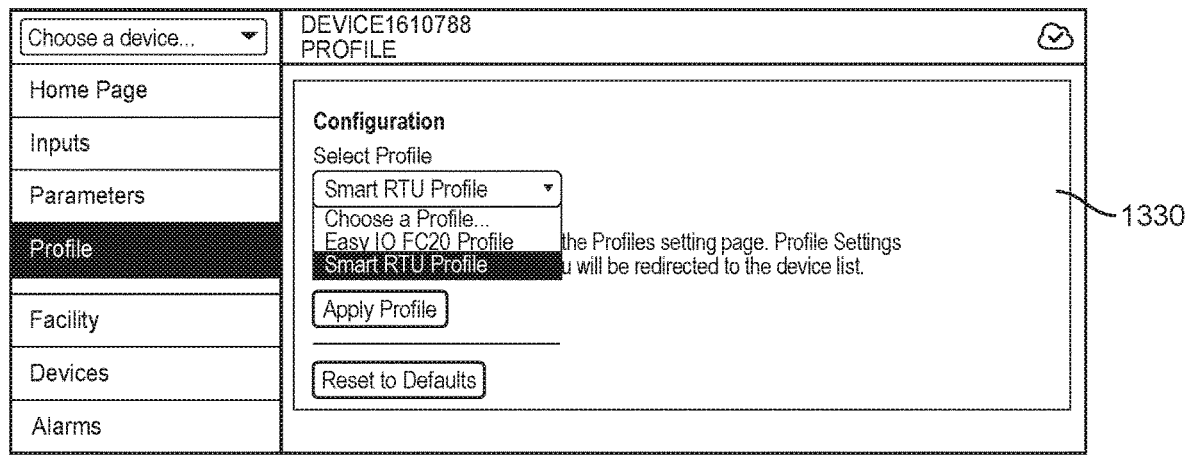

Referring now to FIG. 13B, interface 1300 with a default profile is shown, according to an exemplary embodiment. In some embodiments, interface 1300 displays various information of a default profile, such as device name, description, model name, firmware version, and application software version, such as default window 1310 as shown in FIG. 13B. Referring now to FIG. 13C, interface 1300 for interacting with device windows is shown, according to an exemplary embodiment. Referring now to FIG. 13D, interface 1300 for selecting a profile is shown, according to an exemplary embodiment. Interface 1300 is shown to include configuration window 1330.

Figure 13E:
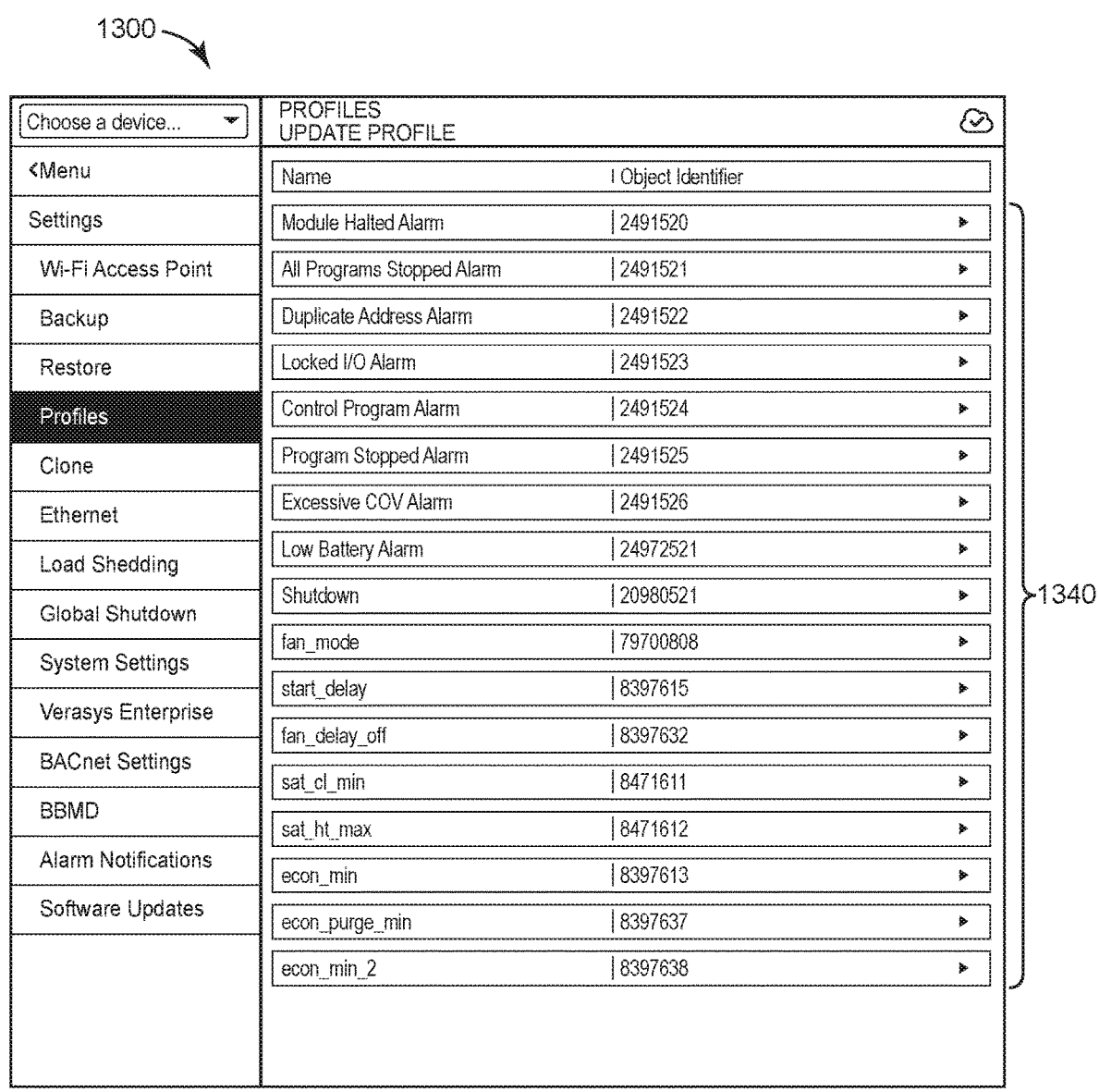

Referring now to FIG. 13E, interface 1300 for displaying various profiles are shown, according to an exemplary embodiment. In some embodiments, profiles for $3^{rd}$ party devices are generated and displayed on interface 1300. A user may selected the one or more devices, such as one of the devices 1340 as shown in FIG. 13 E. This may prompt a window to open that displays particular profile information of a device after configuration (e.g., window 1350 as shown in FIG. 13F).

Figure 13F:
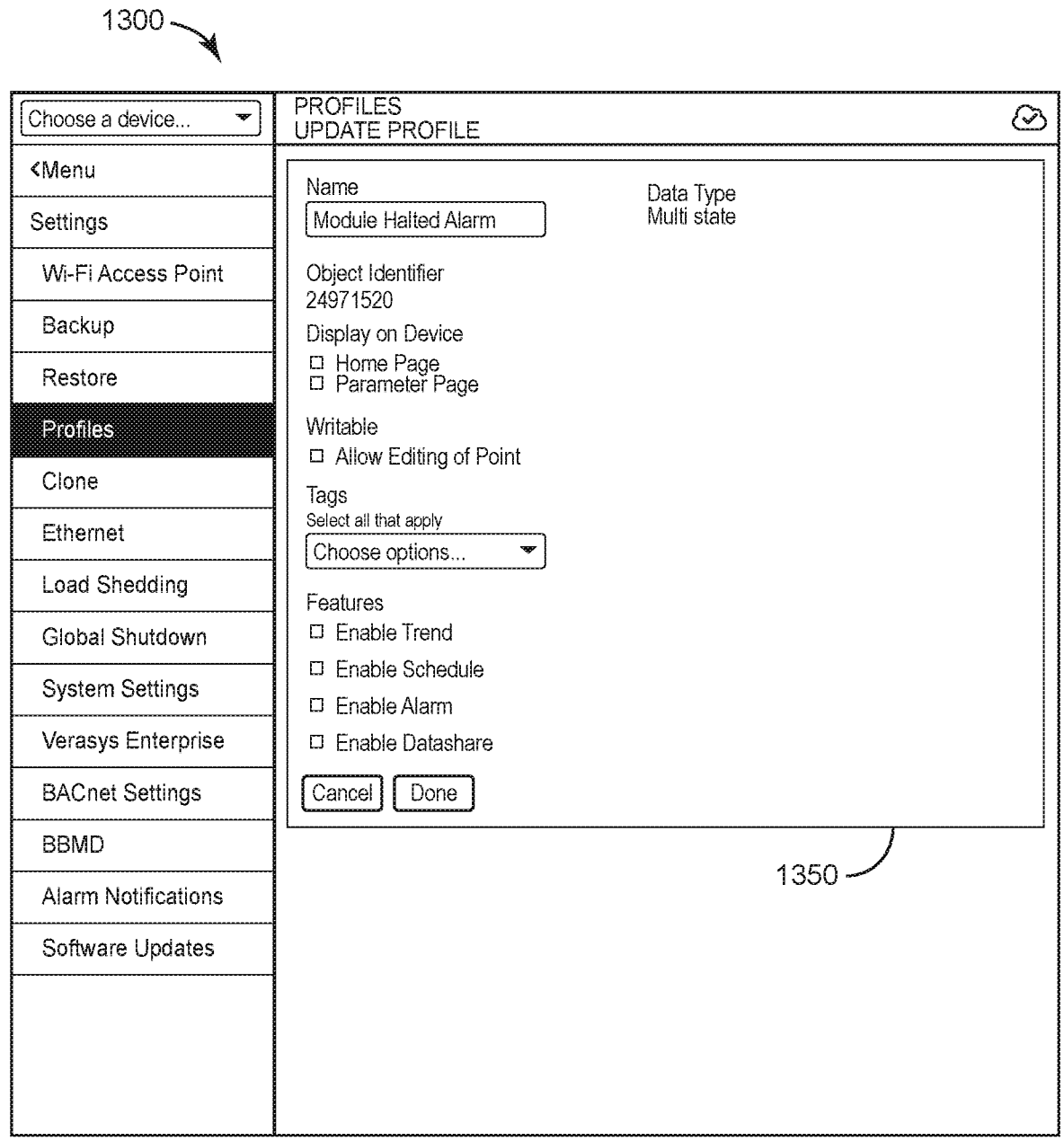
Figure 13G:
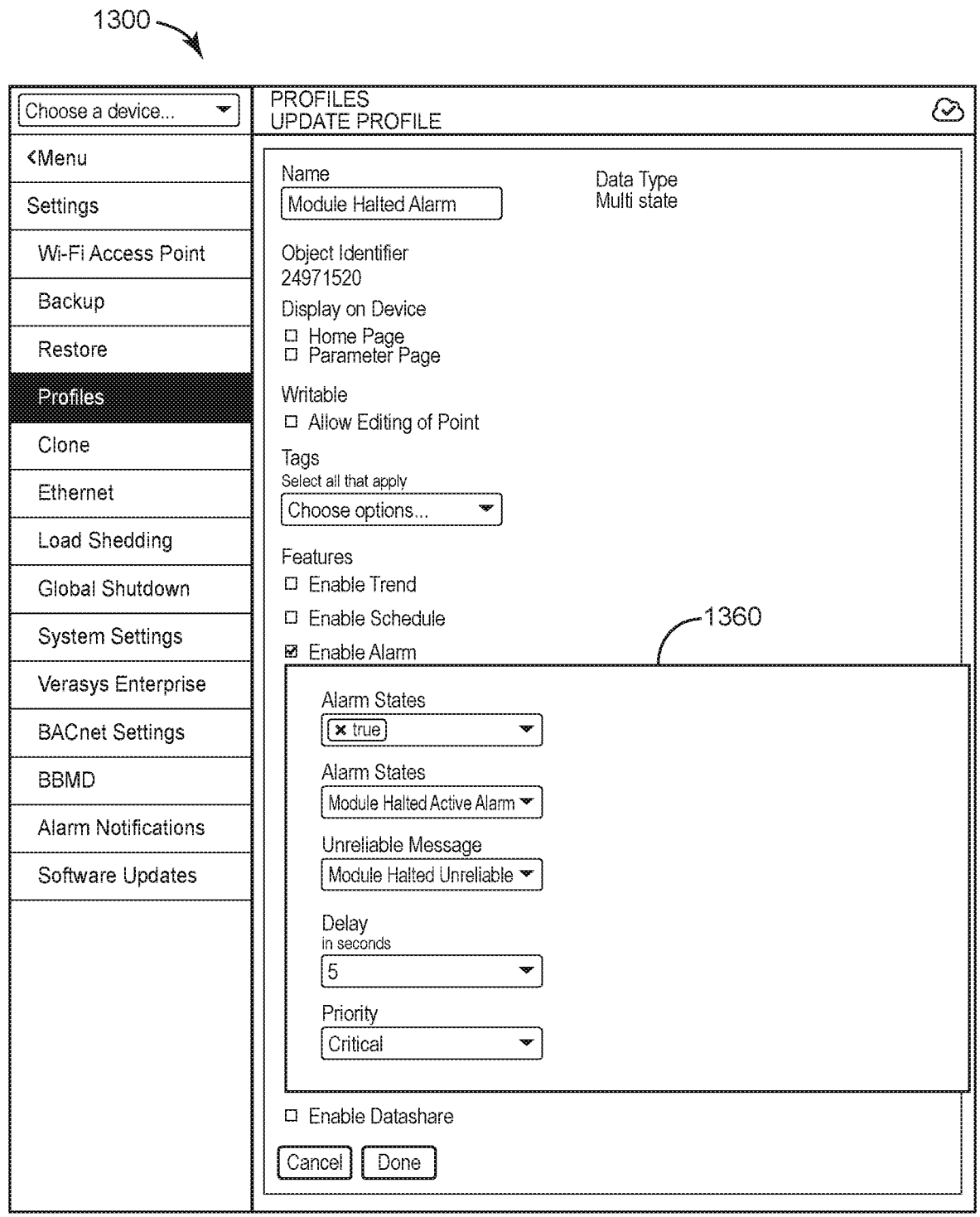

Referring now to FIGS. 13F-G, interface 1300 for displaying a device profile is shown, according to an exemplary embodiment. In some embodiments, a user may select a device from the devices 1340 to see various configuration information (e.g., object ID, data type, point information, etc.) relating to the device. Interface 1300 shows profile 1350 for a Module Halted Alarm device. In some embodiments, profile 1350 allows various features to be enabled, including trends, schedules, alarms, and data share. Interface 1300 shows another profile, profile 1360 for enabling an alarm. A user may select "enable alarm" from profile 1360 to adjust/monitor the alarm notifications for that particular device.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

We claim:

1. A system for updating a-third-party devices in a building management system (BMS), the system comprising:
    a third-party device;
    a device manager of a control network, the device manager configured to update the third-party device and comprising a processing circuit configured to:
        determine that the third-party device has been discovered on the control network;
        populate a template with a set of received data from the third-party device;
        map the third-party device with the control network based on the populated template of received data; and
        configure the third-party device to operate in the control network, wherein configuring the third-party device comprises transforming a data exchange format of the third-party device, wherein the control network operates under a first network protocol and the third-party device operates under a second network protocol and wherein configuring the third-party device further comprises converting the third-party device to operate from the second network protocol to the first network protocol.

2. The system of claim 1, further comprising:
    a user device comprising a user interface connected to the control network; and
    the processing circuit further configured to:
        generate a profile of the third-party device; and
        display the profile of the third-party device to the user interface, wherein the profile comprises the received data.

3. The system of claim 1, wherein the processing circuit is further configured to generate a default template of the third-party device, wherein the default template comprises vendor information or model information or firmware information.

4. The system of claim 1, wherein the control network, the third-party device, and the device manager operate over a building automation and control network (BACnet) protocol, wherein the BACnet protocol may be BACnet/IP, BACnet/Ethernet, or BACnet/MSTP.

5. The system of claim 1, wherein configuring the third-party device further comprises:
    determining that the third-party device has not previously been connected to the control network; and
    generating a new device profile for the third-party device based on the received data.

6. The system of claim 1, wherein configuring the third-party device further comprises:
    determining that the third-party device has previously been connected to the control network; and
    providing a previous device profile based on the received data, wherein the received data comprises vendor information of the third-party device or model information of the third-party device or firmware information of the third-party device.

7. The system of claim 5, wherein the control network, the third-party device, and the device manager operate over a building operation controls network (BACnet) protocol, wherein the BACnet protocol may be BACnet/IP, BACnet/Ethernet, or BACnet/MSTP.

8. A method for updating a device in a building management system (BMS), the method comprising:
    determining that a third-party device has been discovered on a control network, the control network comprising a device manager and a user device;
    populating a template with a set of received data from the third-party device;
    mapping the third-party device with the control network based on the populated template of received data; and
    configuring the third-party device to operate in the control network, wherein configuring the third-party device comprises transforming a data exchange format of the third-party device and converting the third-party device to operate from a second network protocol to a first network protocol, wherein the control network operates under the first network protocol and the third-party device operates under the second network protocol.

9. The method of claim 8, wherein:
the third-party device is connected to the control network via building automation and control network over internet protocol (BACnet/IP) protocol or building building automation and control over master slave token passing (BACnet/MSTP) protocol.

10. The method of claim 8, further comprising:
generating a profile of the third-party device; and
displaying the profile of the third-party device to a user interface, wherein the profile comprises the received data.

11. The method of claim 8, further comprising generating a default template of the third-party device, wherein the default template comprises vendor information or model information or firmware information.

12. The method of claim 8, wherein configuring the third-party device further comprises:
determining that the third-party device has not previously been connected to the control network; and
generating a new device profile for the third-party device based on the received data.

13. The method of claim 8, wherein configuring the third-party device further comprises:
determining that the third-party device has previously been connected to the control network; and
providing a previous device profile based on the received data, wherein the received data comprises vendor information of the third-party device or model information of the third-party device or firmware information of the third-party device.

14. The method of claim 13, wherein the control network, the third-party device, and the device manager operate over a building automation and control network (BACnet) protocol, wherein the BACnet protocol may be BACnet/IP, BACnet/Ethernet, or BACnet/MSTP.

15. A controller for configuring a device in a building management system (BMS), the controller comprising a processing circuit configured to:
determine that a third-party device has been discovered on a control network;
populate a template with a set of received data from the third-party device;
map the third-party device with the control network based on the populated template of received data;
determine that the third-party device has previously been connected to the control network;
provide a previous device profile based on the received data, wherein the received data comprises vendor information, model information, or firmware information of the third-party device; and
configure the third-party device to operate in the control network, wherein configuring the third-party device comprises transforming a data exchange format of the third-party device and converting the third-party device to operate from a second network protocol to a first network protocol, wherein the control network operates under the first network protocol and the third-party device operates under the second network protocol.

16. The controller of claim 15, further comprising:
a user device comprising a user interface connected to the control network; and
the processing circuit further configured to:
generate a profile of the third-party device; and
display the profile of the third-party device to the user interface, wherein the profile comprises the received data.

17. The controller of claim 15, wherein the processing circuit is further configured to generate a default template of the third-party device, wherein the default template comprises the vendor information or model information or firmware information.

18. The controller of claim 15, wherein the control network and the third-party device operate over a building automation and control network (BACnet) protocol, wherein the BACnet protocol may be BACnet/IP, BACnet/Ethernet, or BACnet/MSTP.

19. The controller of claim 15, wherein configuring the third-party device further comprises:
determining that the third-party device has not previously been connected to the control network; and
generating a new device profile for the third-party device based on the received data.

20. The controller of claim 15, wherein configuring the third-party device further comprises:
determining that the third-party device has previously been connected to the control network.

21. A data template for updating a device in a building management system (BMS), the BMS comprising a control network and a processing circuit, the data template comprising a memory,
wherein the memory is configured to store a predetermined set of data regarding the control network,
wherein a template is configured to receive a current set of data from a third-party device,
wherein the memory is further configured to store the current set of data,
wherein the template is further configured to arrange the predetermined set of data with the current set of data, such that the processing circuit is operable to map the third-party device with the control network based on the template, such that the control network is operable to configure the third-party device to communicate in the control network, and
wherein configuring the third-party device comprises transforming a data exchange format of the third-party device and converting the third-party device to operate from a second network protocol to a first network protocol, wherein the control network operates under the first network protocol and the third-party device operates under the second network protocol.

\* \* \* \* \*